United States Patent
Okada et al.

(10) Patent No.: US 9,253,669 B2
(45) Date of Patent: Feb. 2, 2016

(54) NETWORK ANALYSIS METHOD, INFORMATION PROCESSING DEVICE, AND COMPUTER-READABLE RECORDING MEDIUM

(71) Applicant: FUJITSU LIMITED, Kawasaki-shi, Kanagawa (JP)

(72) Inventors: Sumiyo Okada, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 14/077,814

(22) Filed: Nov. 12, 2013

(65) Prior Publication Data

US 2014/0177462 A1 Jun. 26, 2014

(30) Foreign Application Priority Data

Dec. 20, 2012 (JP) ................................. 2012-277895

(51) Int. Cl.
*H04L 12/26* (2006.01)
*H04W 24/08* (2009.01)

(52) U.S. Cl.
CPC ........... *H04W 24/08* (2013.01); *H04L 43/0858* (2013.01)

(58) Field of Classification Search
CPC .................................................. H04L 43/0858
See application file for complete search history.

(56) References Cited

U.S. PATENT DOCUMENTS

2005/0286432 A1* 12/2005 Yasuie et al. .................. 370/244
2010/0165864 A1* 7/2010 Yamaguchi et al. .......... 370/252

FOREIGN PATENT DOCUMENTS

| JP | 2006-13809 | | 1/2006 |
| JP | 2008205651 | A * | 9/2008 |
| JP | 2010-154201 | | 7/2010 |

OTHER PUBLICATIONS

Machine Translation of JP 2008-205651A.*

* cited by examiner

*Primary Examiner* — Huy D Vu
*Assistant Examiner* — Kevin Cunningham
(74) *Attorney, Agent, or Firm* — Staas & Halsey LLP

(57) ABSTRACT

A network analysis method performed by a computer, the network analysis method includes receiving packets from a wired network, extracting a plurality of continuous packets transmitted by a communication device, and a plurality of acknowledgement packets transmitted by a wireless communication device in response to the plurality of continuous packets, and determining whether a delay is due to a wireless communication between the wireless communication device and an access point, based on a time interval of the plurality of continuous packets, and a time interval of the plurality of acknowledgment packets.

19 Claims, 22 Drawing Sheets

FIG. 20

| No. | TIME | DELTA | SA | SP | DA | DP | Protocol | SIZE | SEQ |
|---|---|---|---|---|---|---|---|---|---|
| 16 | 2011-12-22 14:49:35.724499 | 0.000000 | 11.22.222.111 | 80 | 11.22.111.222 | 39916 | TCP | 44 | 3755782530 |
| 19 | 2011-12-22 14:49:35.945476 | 0.220977 | 11.22.222.111 | 80 | 11.22.111.222 | 39916 | TCP | 40 | 3755782531 |
| 20 | 2011-12-22 14:49:35.947273 | 0.001797 | 11.22.222.111 | 80 | 11.22.111.222 | 39916 | TCP | 255 | 3755782531 |
| 21 | 2011-12-22 14:49:35.947473 | 0.000200 | 11.22.222.111 | 80 | 11.22.111.222 | 39916 | TCP | 1500 | 3755782746 |
| 23 | 2011-12-22 14:49:36.214472 | 0.266999 | 11.22.222.111 | 80 | 11.22.111.222 | 39916 | TCP | 1500 | 3755784206 |
| 24 | 2011-12-22 14:49:36.214572 | 0.000100 | 11.22.222.111 | 80 | 11.22.111.222 | 39916 | TCP | 1500 | 3755785666 |
| 26 | 2011-12-22 14:49:36.224954 | 0.010382 | 11.22.222.111 | 80 | 11.22.111.222 | 39916 | TCP | 1500 | 3755787126 |
| 27 | 2011-12-22 14:49:36.225055 | 0.000101 | 11.22.222.111 | 80 | 11.22.111.222 | 39916 | TCP | 1500 | 3755788586 |
| 29 | 2011-12-22 14:49:36.694960 | 0.469905 | 11.22.222.111 | 80 | 11.22.111.222 | 39916 | TCP | 1500 | 3755790046 |
| 30 | 2011-12-22 14:49:36.695065 | 0.000105 | 11.22.222.111 | 80 | 11.22.111.222 | 39916 | TCP | 1500 | 3755791506 |
| 32 | 2011-12-22 14:49:36.705891 | 0.010826 | 11.22.222.111 | 80 | 11.22.111.222 | 39916 | TCP | 1500 | 3755792966 |
| 33 | 2011-12-22 14:49:36.705992 | 0.000101 | 11.22.222.111 | 80 | 11.22.111.222 | 39916 | TCP | 1500 | 3755794426 |
| 35 | 2011-12-22 14:49:36.714527 | 0.008535 | 11.22.222.111 | 80 | 11.22.111.222 | 39916 | TCP | 1500 | 3755795886 |
| 36 | 2011-12-22 14:49:36.714627 | 0.000100 | 11.22.222.111 | 80 | 11.22.111.222 | 39916 | TCP | 1500 | 3755797346 |
| 38 | 2011-12-22 14:49:36.724809 | 0.010182 | 11.22.222.111 | 80 | 11.22.111.222 | 39916 | TCP | 1500 | 3755799806 |
| 39 | 2011-12-22 14:49:36.724910 | 0.000101 | 11.22.222.111 | 80 | 11.22.111.222 | 39916 | TCP | 1500 | 3755800266 |
| 41 | 2011-12-22 14:49:36.844208 | 0.119298 | 11.22.222.111 | 80 | 11.22.111.222 | 39916 | TCP | 1500 | 3755801726 |
| 42 | 2011-12-22 14:49:36.844309 | 0.000101 | 11.22.222.111 | 80 | 11.22.111.222 | 39916 | TCP | 1500 | 3755803186 |
| 44 | 2011-12-22 14:49:36.855339 | 0.011030 | 11.22.222.111 | 80 | 11.22.111.222 | 39916 | TCP | 1500 | 3755804646 |
| 45 | 2011-12-22 14:49:36.855439 | 0.000100 | 11.22.222.111 | 80 | 11.22.111.222 | 39916 | TCP | 1500 | 3755806106 |
| 47 | 2011-12-22 14:49:36.864524 | 0.009085 | 11.22.222.111 | 80 | 11.22.111.222 | 39916 | TCP | 1500 | 3755807566 |
| 48 | 2011-12-22 14:49:36.864674 | 0.000150 | 11.22.222.111 | 80 | 11.22.111.222 | 39916 | TCP | 1500 | 3755809026 |

Ta1

SESSION ESTABLISHMENT

REAL PACKETS

| No. | TIME | DELTA | SA | SP | DA | DP | Protocol | SIZE | SEQ |
|---|---|---|---|---|---|---|---|---|---|
| 15 | 2011-12-22 14:49:35.724051 | 0.000000 | 11.22.111.222 | 39916 | 11.22.222.111 | 80 | TCP | 60 | 1967749048 |
| 17 | 2011-12-22 14:49:35.854381 | 0.130330 | 11.22.111.222 | 39916 | 11.22.222.111 | 80 | TCP | 40 | 1967749049 |
| 18 | 2011-12-22 14:49:35.944927 | 0.090546 | 11.22.111.222 | 39916 | 11.22.222.111 | 80 | HTTP | 367 | 1967749049 |
| 22 | 2011-12-22 14:49:36.213923 | 0.268996 | 11.22.111.222 | 39916 | 11.22.222.111 | 80 | TCP | 40 | 1967749376 |
| 25 | 2011-12-22 14:49:36.224455 | 0.010532 | 11.22.111.222 | 39916 | 11.22.222.111 | 80 | TCP | 40 | 1967749376 |
| 28 | 2011-12-22 14:49:36.694211 | 0.469756 | 11.22.111.222 | 39916 | 11.22.222.111 | 80 | TCP | 40 | 1967749376 |
| 31 | 2011-12-22 14:49:36.704694 | 0.010483 | 11.22.111.222 | 39916 | 11.22.222.111 | 80 | TCP | 40 | 1967749376 |
| 34 | 2011-12-22 14:49:36.714029 | 0.009335 | 11.22.111.222 | 39916 | 11.22.222.111 | 80 | TCP | 40 | 1967749376 |
| 37 | 2011-12-22 14:49:36.724261 | 0.010232 | 11.22.111.222 | 39916 | 11.22.222.111 | 80 | TCP | 40 | 1967749376 |
| 40 | 2011-12-22 14:49:36.843459 | 0.119198 | 11.22.111.222 | 39916 | 11.22.222.111 | 80 | TCP | 40 | 1967749376 |
| 43 | 2011-12-22 14:49:36.854541 | 0.011082 | 11.22.111.222 | 39916 | 11.22.222.111 | 80 | TCP | 40 | 1967749376 |
| 46 | 2011-12-22 14:49:36.864026 | 0.009485 | 11.22.111.222 | 39916 | 11.22.222.111 | 80 | TCP | 40 | 1967749376 |
| 49 | 2011-12-22 14:49:36.884191 | 0.020165 | 11.22.111.222 | 39916 | 11.22.222.111 | 80 | TCP | 40 | 1967749376 |
| 52 | 2011-12-22 14:49:36.904406 | 0.020215 | 11.22.111.222 | 39916 | 11.22.222.111 | 80 | TCP | 40 | 1967749376 |
| 55 | 2011-12-22 14:49:36.914090 | 0.009684 | 11.22.111.222 | 39916 | 11.22.222.111 | 80 | TCP | 40 | 1967749376 |
| 58 | 2011-12-22 14:49:36.923974 | 0.009884 | 11.22.111.222 | 39916 | 11.22.222.111 | 80 | TCP | 40 | 1967749376 |
| 61 | 2011-12-22 14:49:36.934256 | 0.010282 | 11.22.111.222 | 39916 | 11.22.222.111 | 80 | TCP | 40 | 1967749376 |

SESSION ESTABLISHMENT

REAL PACKETS

NETWORK ANALYSIS METHOD, INFORMATION PROCESSING DEVICE, AND COMPUTER-READABLE RECORDING MEDIUM

CROSS-REFERENCE TO RELATED APPLICATIONS

This application is based upon and claims the benefit of priority of the prior Japanese Patent Application No. 2012-277895, filed on Dec. 20, 2012, the entire contents of which are incorporated herein by reference.

FIELD

The embodiments discussed herein are related to a network analysis method, an information processing device, and a computer-readable recording medium.

BACKGROUND

Currently, communications are performed via communication networks. A communication network may include a wired section or a wireless section. For example, Transmission Control Protocol/Internet Protocol (TCP/IP) exists as a standard protocol for the Internet. Transmission and reception of packetized data are widely performed on communication networks by using TCP/IP.

Incidentally, service providers or the like may perform management of data communication quality on communication networks. Accordingly, methods for managing data communication quality for communication networks have been disclosed. For example, there have been disclosed techniques that observe the continuity and arrival intervals of received packets to determine whether a packet drop has occurred in either of high speed and low speed sections. Further, for example, there have been also disclosed techniques that generate delay time fluctuation characteristic data from packet delivery acknowledgement information in a wireless section.

As related art, there have been disclosed, for example, Japanese Laid-open Patent Publication No. 2006-13809 and Japanese Laid-open Patent Publication No. 2010-154201.

In order to detect communication delays in wireless sections within a communication network, service providers or the like may install a monitoring device for each wireless section, and monitor communication for each wireless section individually. However, many wireless sections within a communication network exist on network terminals on the user side which connect wireless terminals and wireless base stations. Therefore, installing a monitoring device for each wireless section may lead to an increase in the number of monitoring devices to be installed.

It may not be possible to install a monitoring device in every wireless base station. For example, a wireless base station may exist in a location where it is difficult to install a monitoring device. In this case, information may be collected by using monitoring devices installed in limited locations. However, using information collected on limited wireless sections alone makes it difficult to monitor and analyze communications in other wireless sections.

SUMMARY

According to an aspect of the invention, a network analysis method performed by a computer, the network analysis method includes receiving packets from a wired network, extracting, from the packets, a plurality of continuous packets transmitted by a communication device, and a plurality of acknowledgement packets transmitted by a wireless communication device in response to the plurality of continuous packets, and determining whether a delay is due to a wireless communication between the wireless communication device and an access point, based on a time interval of the plurality of continuous packets, and a time interval of the plurality of acknowledgment packets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 20 illustrates an example of DATA packets according to the second embodiment;

FIG. 21 illustrates an example of ACK packets according to the second embodiment.

DESCRIPTION OF EMBODIMENTS

Hereinafter, embodiments will be described with reference to the drawings.

First Embodiment

Figure 1:
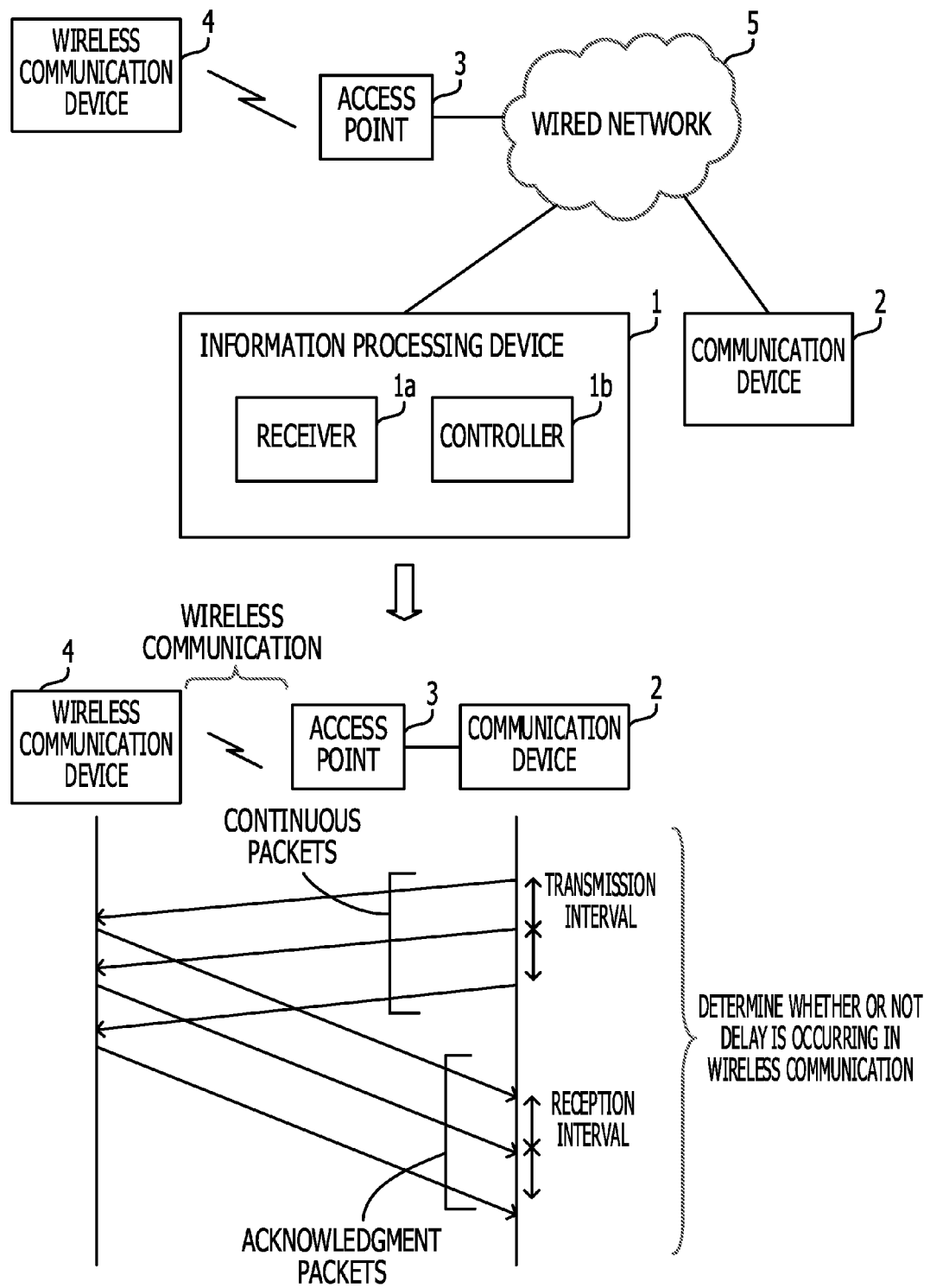
FIG. 1 illustrates a communication system according to a first embodiment.

FIG. 1 illustrates a communication system according to a first embodiment. The communication system according to the first embodiment includes an information processing device 1, a communication device 2, an access point 3, a wireless communication device 4, and a wired network 5. The information processing device 1, the communication device 2, and the access point 3 are connected to the wired network 5. The communication device 2 communicates with the wireless communication device 4 via the wired network 5 and the access point 3. The section between the communication device 2 and the access point 3 with the wired network 5 therebetween is a wired section where wired communication takes place. The section between the access point 3 and the wireless communication device 4 is a wireless section where wireless communication takes place.

The communication device 2 is, for example, an information processing device such as a computer. The access point 3 is, for example, a relay device or a wireless base station that may relay wireless communications.

The information processing device 1 includes a receiver is and a controller 1b. The receiver is receives packets from the wired network 5. For example, a relay device that relays packets transmitted and received on the wired network 5 duplicates the packets and forwards the duplicated packets also to the information processing device 1. The receiver is receives the duplicated packets. This method is sometimes referred to as port mirroring. The receiver is may store collected packets into a memory (not illustrated in FIG. 1) provided in the information processing device 1. Alternatively, packets may be extracted by splitting a signal by a TAP device.

The controller 1b extracts multiple continuous packets transmitted by the communication device 2, from received packets (for example, extract a set among the received packets). The controller 1b extracts multiple acknowledgement packets transmitted by the wireless communication device 4 in response to the multiple continuous packets, from the received packets. Based on the time interval (reception interval) of the multiple continuous packets and the time interval (reception interval) of the multiple acknowledgment packets, the controller 1b determines whether or not a delay is occurring in the wireless communication between the wireless communication device 4 and the access point 3.

In this regard, multiple continuous packets transmitted by the communication device 2 refers to, for example, packets continuously transmitted by the communication device 2 to the wireless communication device 4. For example, TCP/IP is able to identify these multiple continuous packets by a source/destination Internet Protocol (IP) address, a sequence number, or the like included in each of the packets. Hereinafter, multiple continuous packets transmitted by the communication device 2 will be sometimes referred to as continuous packets.

The controller 1b may extract a pair of acknowledgement packets delayed owing to retransmission from the multiple acknowledgement packets, and based on the periodicity of the time interval of the acknowledgement packets included in the pair, the controller 1b may determine whether or not a delay is occurring in the wireless communication. More specifically, the controller 1b determines that a delay is occurring in the wireless communication in a case where the reception timing of the acknowledgement packets that are subject to analysis coincides with a period characteristic of a communication standard used in the wireless section, or coincides with the period within a predetermined precision. This is because the retransmission period is generally determined in accordance with the wireless communication standard.

The controller 1b may narrow down (select) acknowledgment packets that are subject to analysis for a delay in the wireless communication (delay candidates), based on the time interval of the continuous packets transmitted by the communication device 2 and the reception interval of the multiple acknowledgment packets transmitted by the wireless communication device 4 in response to the continuous packets.

More specifically, the following narrowing-down (selection) methods are conceivable. A first method determines, as acknowledgement packets that are subject to analysis for a delay in the wireless communication, a pair of acknowledgement packets for which the time interval of corresponding continuous packets is less than or equal to a first threshold and the time interval of the acknowledgment packets is greater than or equal to a second threshold. Other pairs of acknowledgement packets are excluded from the analysis for a delay in the wireless communication.

This is because if the time interval of continuous packets is relatively large, there is a possibility that a delay is occurring for causes other than a delay in the wireless section. Possible causes of the delay include, for example, high server load, and a wait for ACK due to Round Trip Time (RTT). By excluding acknowledgment packets corresponding to continuous packets separated by a relatively large time interval from analysis, delays due to such factors are excluded.

The first and second thresholds are determined in accordance with the communication environment. For example, the communication condition of the continuous packets transmitted by the communication device 2 is measured, and the upper limit of the time interval at which packets may be identified as continuous packets is determined as the first threshold. Likewise, the communication condition of the acknowledgement packets transmitted by the wireless communication device 4 is measured, and the upper limit of the time interval at which no delay is determined as occurring is determined as the second threshold.

A second method determines, as acknowledgment packets that are subject to analysis for a delay in the wireless communication, a pair of acknowledgment packets for which the difference between the time interval of multiple corresponding continuous packets and the time interval of the acknowledgement packets is greater than or equal to a third threshold. The second method determines, as acknowledgment packets that are not subject to analysis for a delay in the wireless communication, a pair of acknowledgment packets for which this difference is less than the third threshold. The reason for adopting this method is the same as that for the first method. Like the first and second thresholds, the third threshold is also determined in advance in accordance with the communication environment.

By using either of the first and second methods, the controller 1b is able to remove noise due to delay factors other than a delay in the wireless section, thereby improving the precision of analysis.

According to the information processing device 1, the receiver is receives packets from the wired network 5. From a set of the received packets, the controller 1b extracts multiple continuous packets transmitted by the communication device 2, and multiple acknowledgement packets transmitted by the wireless communication device 4 in response to the multiple continuous packets. Based on the time interval of the multiple continuous packets and the time interval of the multiple acknowledgement packets, the controller 1b determines whether or not a delay is occurring in the wireless communication between the wireless communication device 4 and the access point 3.

Consequently, it is possible to determine that a transmission delay is occurring in the wireless section, without directly monitoring the wireless section. Placing a monitoring device not in the wireless section but in the wired section in this way allows packet capture to be performed in a concentrated matter. For this reason, packet capture may not have to be performed for each wireless section. Therefore, even if multiple wireless sections exist, packets may be captured easily. The ability to perform packet capture in a concentrated manner enables concentration of monitoring devices. That is, a monitoring device may not be installed for every wireless section. Therefore, the number of monitoring devices may be reduced. In this way, it is possible to efficiently determine the wireless section in which a delay is occurring.

Second Embodiment

Figure 2:
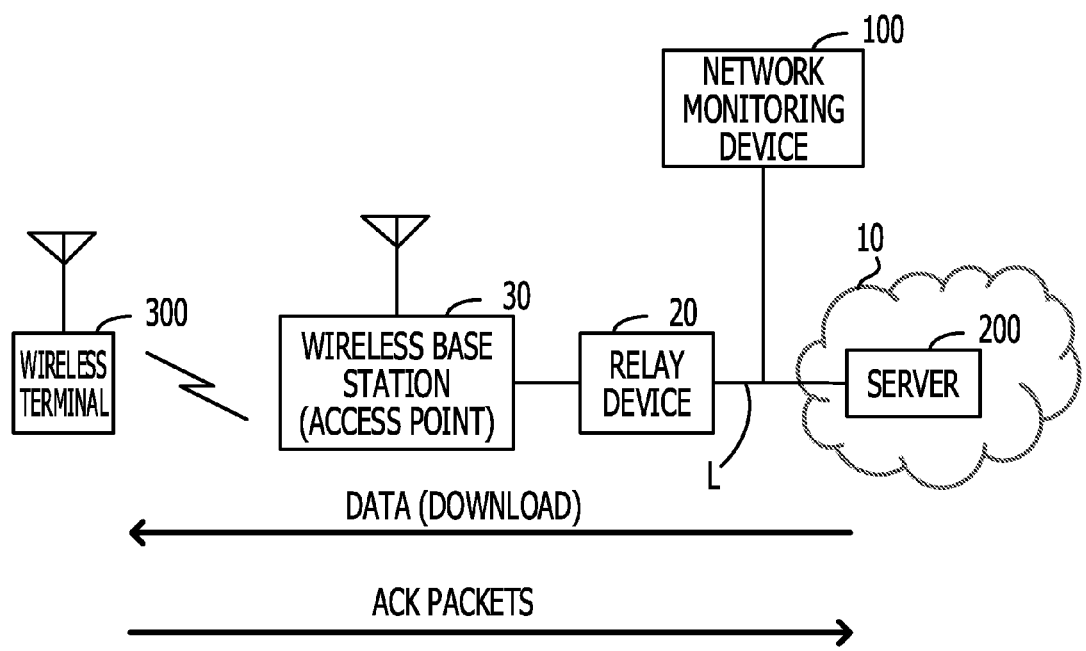
FIG. 2 illustrates a communication system according to a second embodiment.

FIG. 2 illustrates a communication system according to a second embodiment. The communication system according to the second embodiment includes a network monitoring device 100, a server 200, and a wireless terminal 300. The server 200 and the wireless terminal 300 communicate with each other via a network 10, a relay device 20, and a wireless base station 30. The network monitoring device 100 is connected to a wired transmission line L between the network 10 and the relay device 20. The transmission line L may be included in the network 10.

The section between the network 10, the relay device 20, and the wireless base station 30 is a wired section where wired communication takes place. The section between the wireless base station 30 and the wireless terminal 300 is a wireless section where wireless communication takes place. The wireless terminal 300 is able to communicate with the server 200, with the wireless base station 30 as an access point.

The network monitoring device 100 is a computer that monitors the communication between the server 200 and the wireless terminal 300. The server 200 is a server computer that provides predetermined services to the wireless terminal 300. The wireless terminal 300 is a client terminal that communicates with the server 200 in order to use the services provided by the server 200. The wireless terminal 300 may be an electronic device such as a cellular phone or a smart device, or may be a client computer.

For example, the wireless terminal 300 is able to download data from the server 200. In that case, the data to be downloaded is received by the wireless terminal 300 after passing through the server 200, the relay device 20, and the wireless bases station 30 in this order.

For example, in communications by TCP, when the transmitting end transmits data, the receiving end returns an acknowledgement (ACK) packet as a data acknowledgement. Accordingly, in the case of the communication system according to the second embodiment, when the wireless terminal 300 downloads data, and the data is received by the wireless terminal 300, the wireless terminal 300 transmits an ACK packet to the source (the server 200).

This ACK packet passes through the wireless base station 30 and the relay device 20 in this order before being received by the server 200. The server 200 thus confirms that the data has reached the wireless terminal 300.

Meanwhile, the network monitoring device 100 performs packet capture from the traffic flowing through the transmission line L between the relay device 20 and the server 200, and performs network monitoring and analysis via the wired transmission line section. Packet capture refers to capturing packets from the traffic flowing through a transmission line.

Figure 3:
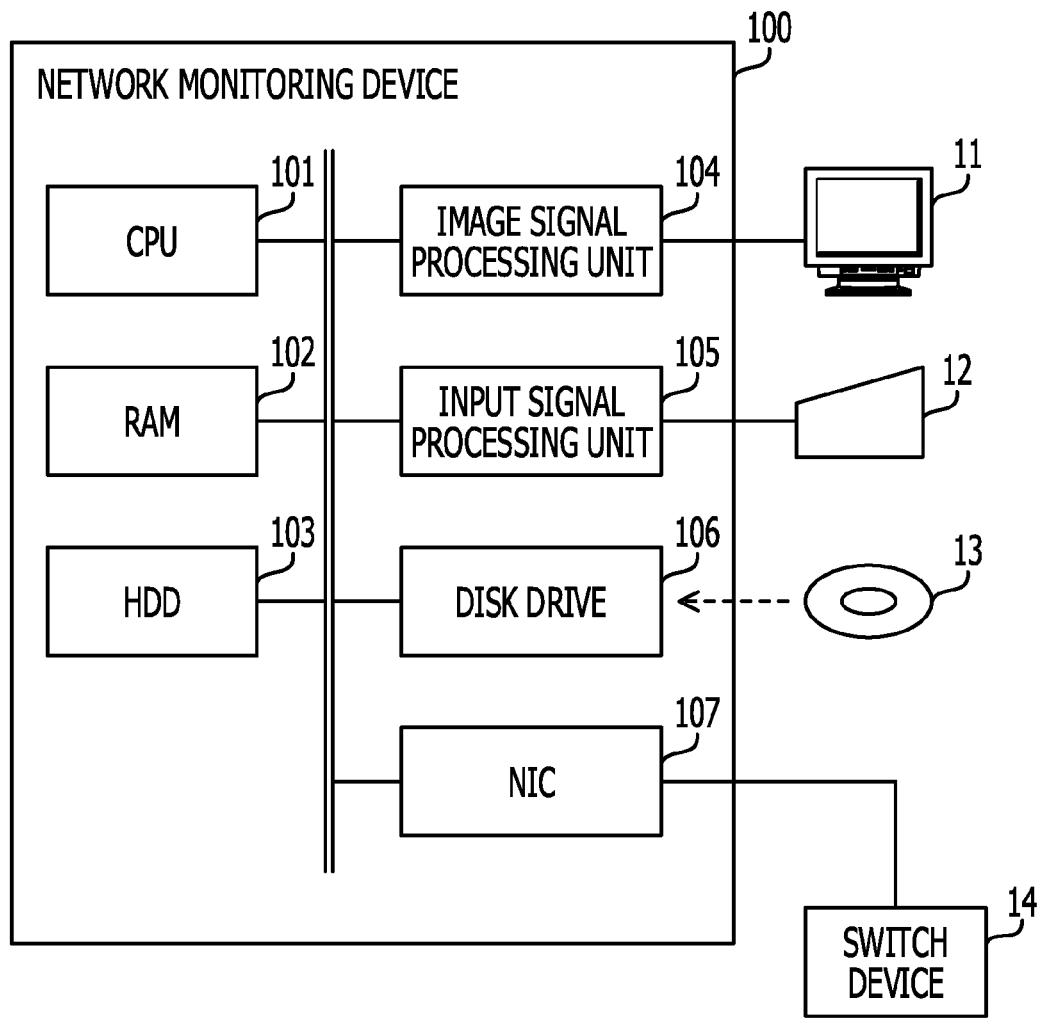
FIG. 3 illustrates a hardware example according to the second embodiment.

FIG. 3 illustrates a hardware example according to the second embodiment. The network monitoring device 100 includes a CPU 101, a random access memory (RAM) 102, a hard disk drive (HDD) 103, an image signal processing unit 104, an input signal processing unit 105, a disk drive 106, and a network interface card (NIC) 107. Each of these units is connected to the bus of the network monitoring device 100.

The CPU 101 is a processor that controls processing of information by the network monitoring device 100. The CPU 101 reads out at least part of a program and data stored in the HDD 103, expands the program and the data in the RAM 102, and executes the program. The network monitoring device 100 may be provided with multiple processors to execute the program in a distributed fashion.

The RAM 102 is a volatile memory that temporarily stores the program executed by the CPU 101 and data used for processing. The network monitoring device 100 may include another type of memory other than RAM, or may include multiple memories.

The HDD 103 is a non-volatile storage device that stores programs such as an OS program or an application program, and data. In accordance with an instruction from the CPU 101, the HDD 103 reads and writes data from and to a built-in magnetic disk. The network monitoring device 100 may include another type of non-volatile storage device other than a HDD (for example, a solid state drive (SDD)). The network monitoring device 100 may include multiple storage devices.

The image signal processing unit 104 outputs an image to a display 11 connected to the network monitoring device 100, in accordance with an instruction from the CPU 101. As the display 11, for example, a cathode ray tube (CRT) display or a liquid crystal display may be used.

The input signal processing unit 105 acquires an input signal from an input device 12 connected to the network monitoring device 100, and outputs the input signal to the CPU 101. As the input device 12, for example, a pointing device such as a mouse or a touch panel, a keyboard, or the like may be used.

The disk drive 106 is a drive device that reads a program or data recorded on a recording medium 13. As the recording medium 13, for example, a magnetic disk such as a flexible disk (FD) or a HDD, an optical disc such as a compact disc (CD) or a digital versatile disc (DVD), or a magneto-optical disk (MO) may be used. For example, the disk drive 106 stores the program and data read from the recording medium 13 into the RAM 102 or the HDD 103, in accordance with an instruction from the CPU 101.

The NIC 107 is connected to a switch device 14 that relays communication through the transmission line L. The NIC 107 transmits and receives data to and from another computer or communication apparatus via the switch device 14. The NIC 107 receives packets transmitted on the transmission line L which are duplicated by the switch device 14.

Figure 4:
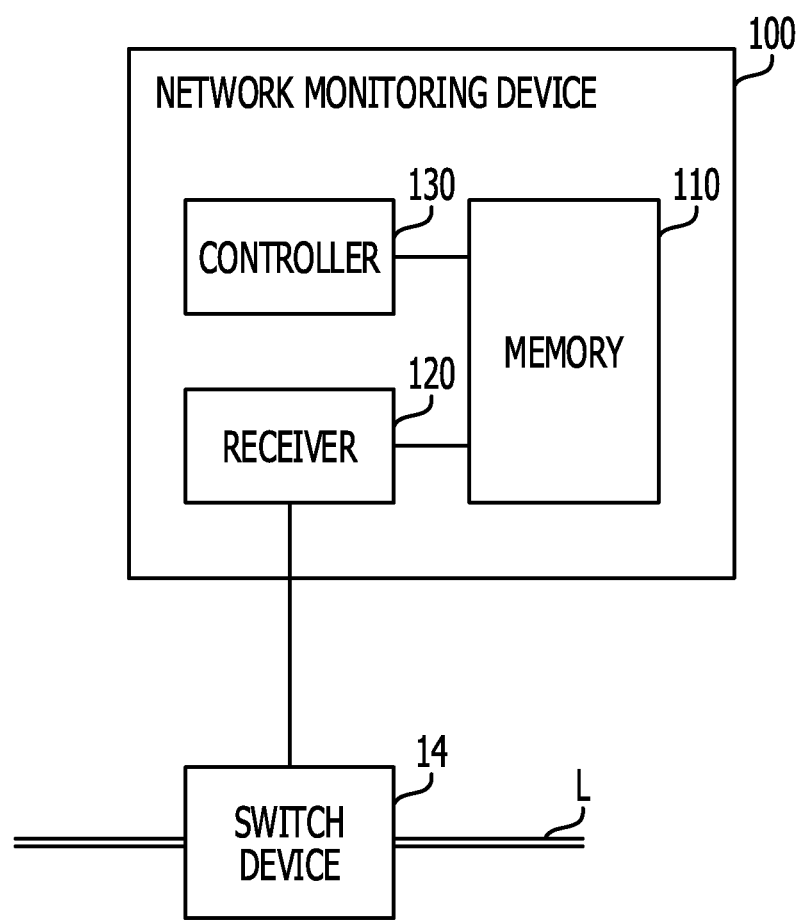
FIG. 4 illustrates a software example according to the second embodiment.

FIG. 4 illustrates a software example according to the second embodiment. Various units illustrated in FIG. 4 may be implemented by, for example, the CPU 101 executing a program stored in the RAM 102. The network monitoring device 100 includes a memory 110, a receiver 120, and a controller 130.

The memory 110 stores packets received by the receiver 120.

The receiver 120 receives packets duplicated and transmitted by the switch device 14, and stores the packets into the memory 110. The packets include data transmitted and received to and from the server 200 and the wireless terminal 300.

The controller 130 determines the presence/absence of a communication delay in the wireless section, based on a set of packets stored in the memory 110. For example, the controller 130 accepts an instruction for starting network analysis when a predetermined operation is made using the input device 12 by the administrator of the network. Then, the controller 130 determines the presence/absence of a communication delay in the wireless section in response to this instruction. The controller 130 may cause the display 11 to display a screen indicating the results of the analysis.

Next, an operation for detecting the possibility of a delay occurring in the wireless section from information about the reception interval of ACK packets will be described.

Figure 5:
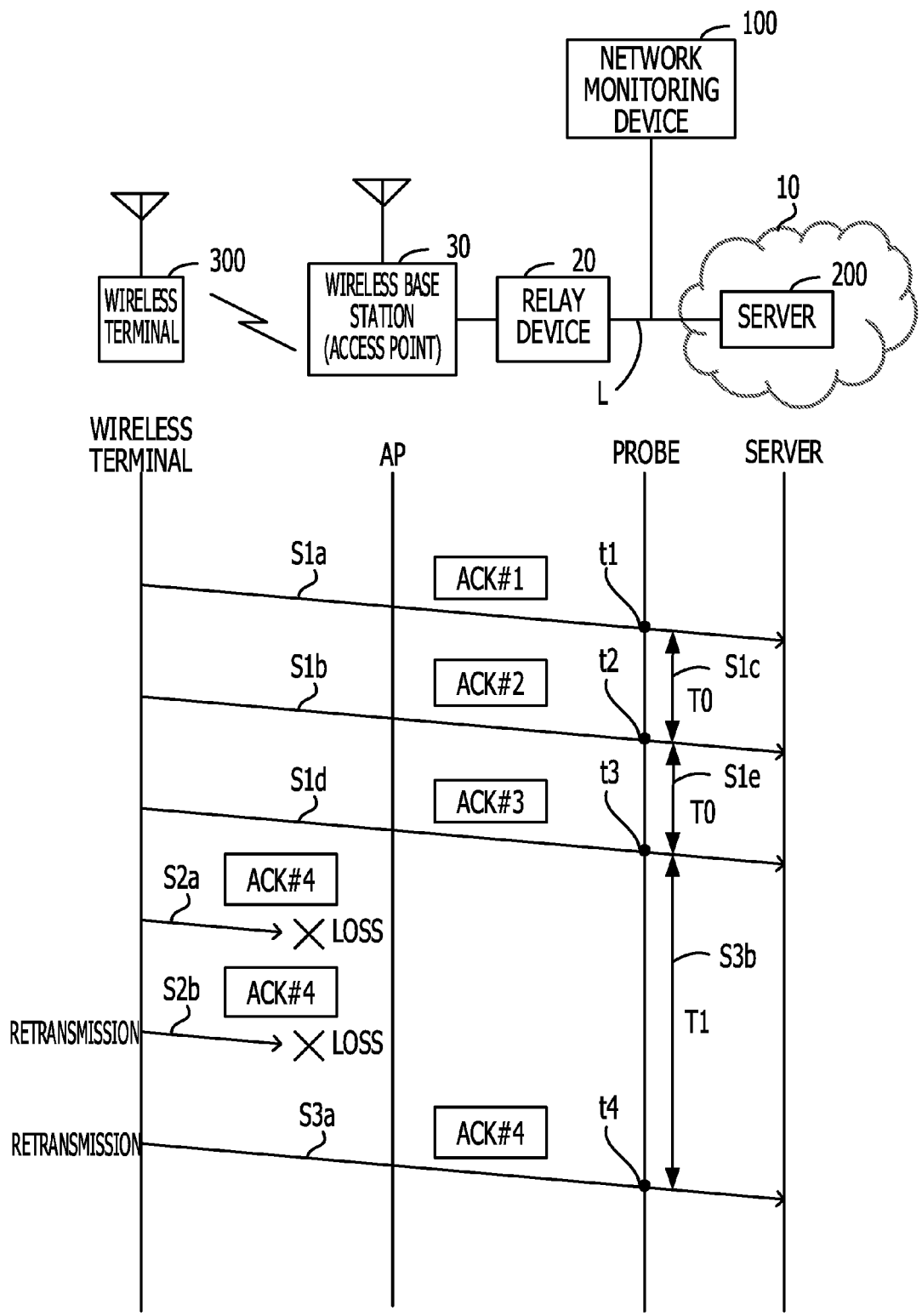
FIG. 5 illustrates an example of an ACK delay according to the second embodiment.

FIG. 5 illustrates an example of an ACK delay according to the second embodiment. FIG. 5 illustrates a state in which arrival of an ACK packet is delayed owing to a communication failure that has occurred in the wireless section. In FIG. 5, AP (access point) represents the wireless base station 30, and Probe represents the network monitoring device 100 (the same applies hereinafter). Hereinafter, the processing illustrated in FIG. 5 will be described with reference to process numbers.

<S1a> The wireless terminal 300 transmits an ACK packet #1 toward the server 200, as a response to a packet transmitted from the server 200. The network monitoring device 100 performs packet capture from the traffic on the transmission line L, and detects the arrival time t1 of the ACK packet #1 at the network monitoring device 100 itself.

<S1b> The wireless terminal 300 transmits an ACK packet #2 toward the server 200, as a response to a packet transmitted from the server 200. The network monitoring device 100 performs packet capture from the traffic on the transmission line L, and detects the arrival time t2 of the ACK packet #2 at the network monitoring device 100 itself.

<S1c> The network monitoring device 100 recognizes a reception interval T0, which is the time difference between the arrival time t1 of the ACK packet #1 and the arrival time t2 of the ACK packet #2.

<S1d> The wireless terminal 300 transmits an ACK packet #3 toward the server 200, as a response to a packet transmitted from the server 200. The network monitoring device 100 performs packet capture from the traffic on the transmission line L, and detects the arrival time t3 of the ACK packet #3 at the network monitoring device 100 itself.

<S1e> The network monitoring device 100 recognizes a reception interval T0, which is the time difference between the arrival time t2 of the ACK packet #2 and the arrival time t3 of the ACK packet #3.

<S2a> Suppose that the wireless terminal 300 transmits an ACK packet #4, but the packet is lost on the wireless transmission line.

<S2b> Suppose that the wireless terminal 300 retransmits the ACK packet #4, but the packet is lost again.

<S3a> Suppose that the wireless terminal 300 performs the second retransmission of the ACK packet #4, and this time the ACK packet #4 reaches the server 200. The network monitoring device 100 performs packet capture from the traffic on the transmission line L, and detects the arrival time t4 of the ACK packet #4 at the network monitoring device 100 itself.

<S3b> The network monitoring device 100 recognizes a reception interval T1, which is the time difference between the arrival time t3 of the ACK packet #3 and the arrival time t4 of the ACK packet #4.

Now, in a case where communication is being performed normally as in S1a to S1e, the reception interval of the ACK packets #1 and #2 and the reception interval of the ACK packets #2 and #3 are equal to each other, both being the time interval T0.

To the contrary, in a case where a communication failure occurs in the wireless section and the ACK packet #4 is retransmitted as in S2a, S2b, and S3a, the arrival time of the ACK packet #4 is delayed. Consequently, the reception interval T1 between the ACK packets #3 and #4 becomes large in comparison to the reception interval T0.

As described above, if, for example, a communication failure occurs in the wireless section, and loss of an ACK packet and retransmission of the ACK packet occur, the reception interval of ACK packets becomes large in comparison to the reception interval during normal communication.

Therefore, by monitoring the reception interval of ACK packets on the wired section such as a wired transmission line through which ACK packets flow, for example, the transmission line L, the network monitoring device 100 is able to recognize that there is a possibility of a delay occurring in the wireless section. The same applies for the case of loss of a data packet from the AP to the wireless terminal. The same applies for the case where a data packet is lost when transmitted from the wireless base station, and the data packet is retransmitted. Further, other than losses in the wireless section, retransmission occurs also in the case of bit errors (such as partial destruction of data), and the same operation is performed.

The above-mentioned sequence is described below in a generalized fashion. ACK packets are transmitted from the wireless terminal 300 to the server 200 via the wireless base station 30. The network monitoring device 100 measures the reception interval of the ACK packets.

At this time, suppose that the reception interval of the ACK packets #1 and #2, the reception interval of the ACK packets #2 and #3, . . . and the reception interval of ACK packets #(n) and #(n+1) are equal to each other, all being equal to the reception interval T0 (n=1, 2, 3, . . . ). Suppose that the reception interval of ACK packets #(n+1) and #(n+2) is equal to the arrival interval T1, and T0<T1.

This represents a case where, when the same value of ACK packet reception interval is occurring continuously, a given ACK packet is acquired, and as a result, the reception interval becomes a value greater than the previous value. In such a state, the network monitoring device 100 may recognize that there is a possibility of a delay occurring owing to some communication failure in the wireless section between the wireless terminal 300 and the wireless base station 30.

Next, phenomena will be described in which a delay is not occurring in the wireless section even through the reception interval of ACK packets increases. In the foregoing description, it is supposed that the network monitoring device 100 is able to recognize the "possibility" of a delay occurring in the wireless section, from information about the reception interval of ACK packets.

This is because there are phenomena in which even through the reception interval for a given ACK packet becomes large in comparison to the reception interval for other ACK packets, the increase in reception interval is not caused by a delay in the wireless section. That is, even if the reception interval of ACK packets increases, the increase may not be entirely attributable to a delay in the wireless section.

Therefore, there may be phenomena in which the reception interval for a given packet increases in comparison to the reception interval for other ACK packets for causes other than a delay that occurs in the wireless section. Accordingly, in order to determine that a delay is occurring in the wireless section, these phenomena are to be excluded.

Other than a delay in the wireless section, there are mainly four causes of an increase in the reception interval of ACK packets, including a cause on the sever side, a wait for ACK due to RTT, a cause at the TCP level, and a cause on the wireless terminal side. Each of these causes will be described below.

First, a delay in the arrival of an ACK packet due to a cause on the server side will be described.

Figure 6:
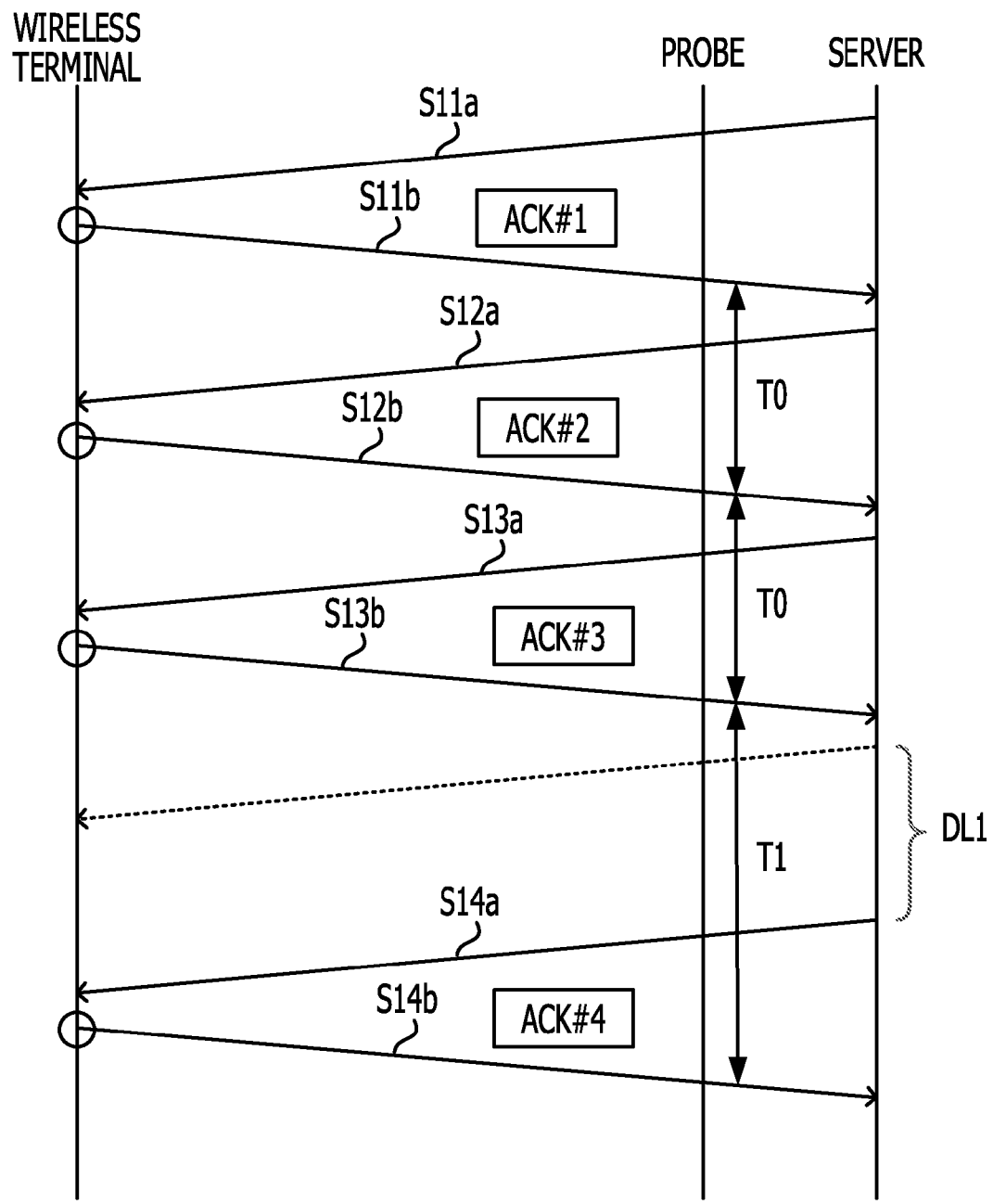
FIG. 6 illustrates an example of an ACK delay due to a server factor.

FIG. 6 illustrates an example of an ACK delay due to a server factor according to the second embodiment. Hereinafter, the processing illustrated in FIG. 6 will be described with reference to process numbers.

<S11a> The server 200 transmits a packet toward the wireless terminal 300.

<S11b> When the wireless terminal 300 receives the packet, the wireless terminal 300 transmits an ACK packet #1 to the server 200.

<S12a> The server 200 transmits a packet toward the wireless terminal 300.

<S12b> When the wireless terminal 300 receives the packet, the wireless terminal 300 transmits an ACK packet #2 to the server 200.

<S13a> The server 200 transmits a packet toward the wireless terminal 300.

<S13b> When the wireless terminal 300 receives the packet, the wireless terminal 300 transmits an ACK packet #3 to the server 200.

<S14a> For example, a delay occurs in the packet transmission process on the server 200, and a packet is transmitted to the wireless terminal 300 after a delay of a time DL1 from the time when the packet is otherwise intended to be transmitted.

<S14b> When the wireless terminal 300 receives the packet, the wireless terminal 300 transmits an ACK packet #4 to the server 200.

Now, in a case where there is no delay in the packet transmission process on the server 200 side as in S11a to S13b, the reception interval of the ACK packets #1 and #2 and the reception interval of the ACK packets #2 and #3 in the network monitoring device 100 are equal to each other, both being the time interval T0.

To the contrary, if a delay occurs in the packet transmission process on the server 200 side as in S14a and S14b, arrival of the ACK packet #4 is delayed. Thus, the reception interval T1 between the ACK packets #3 and #4 in the network monitoring device 100 becomes greater than the previous reception interval T0 (T0<T1).

In this way, the reception interval of ACK packets also increases owing to a cause on the server 200 side (for example, a delay in the packet transmission process within the server 200).

Next, a delay in the arrival of an ACK packet caused by a wait for ACK due to RTT will be described. RTT refers to the time from when a packet is issued to when a response is returned. RTT serves as an indicator of the response speed of a network. A wait for ACK due to RTT means that owing to a delay in the response speed of an ACK packet, the ACK packet is not successfully received within the time in which the ACK packet is otherwise intended to be received, and a waiting time occurs as a result.

Figure 7:
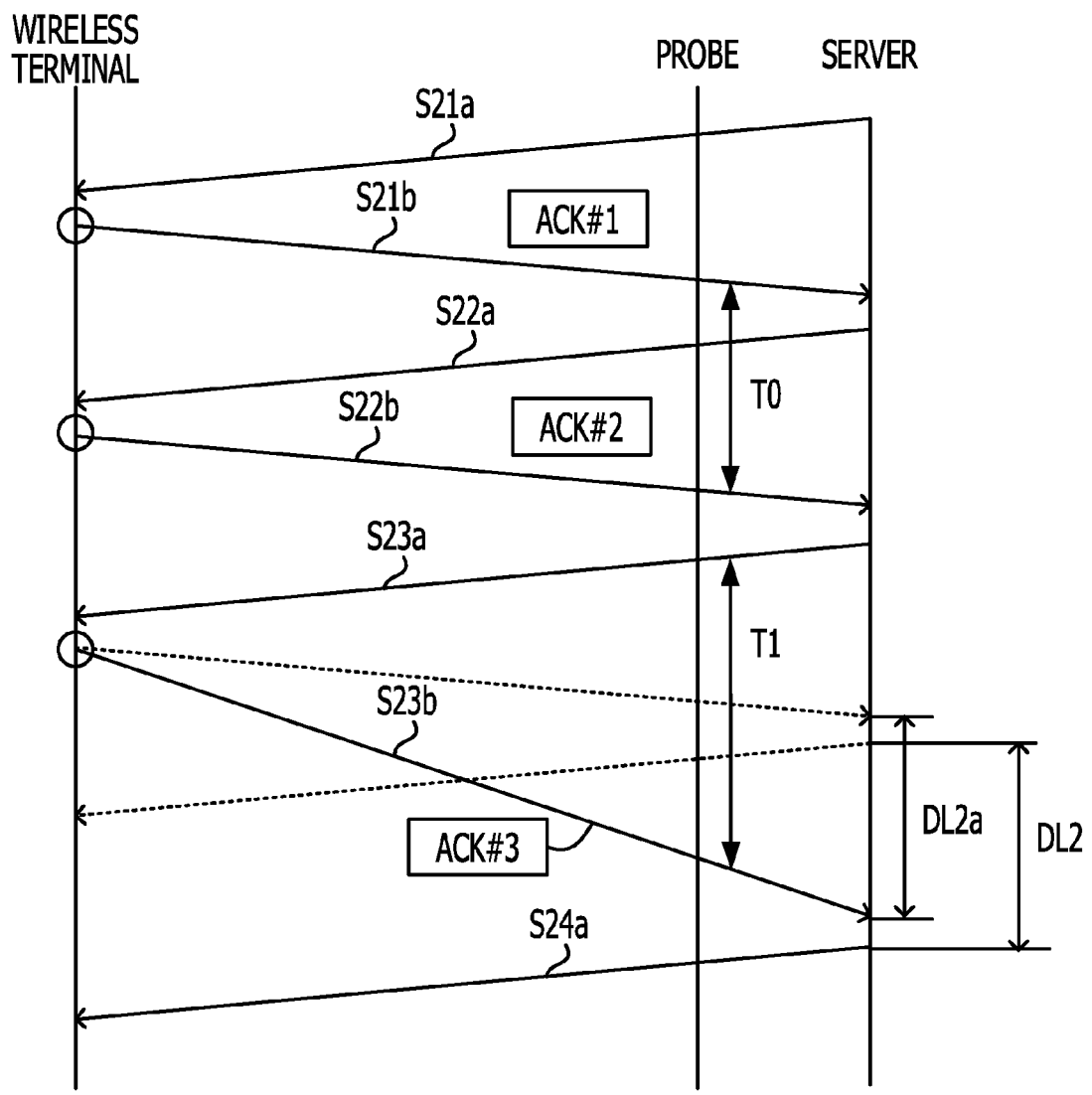
FIG. 7 illustrates an example of an ACK delay due to RTT according to the second embodiment.

FIG. 7 illustrates an example of an ACK delay due to RTT according to the second embodiment. Hereinafter, the processing illustrated in FIG. 7 will be described with reference to process numbers.

<S21a> The server 200 transmits a packet toward the wireless terminal 300.

<S21b> When the wireless terminal 300 receives the packet, the wireless terminal 300 transmits an ACK packet #1 to the server 200.

<S22a> The server 200 transmits a packet toward the wireless terminal 300.

<S22b> When the wireless terminal 300 receives the packet, the wireless terminal 300 transmits an ACK packet #2 to the server 200.

<S23a> The server 200 transmits a packet toward the wireless terminal 300.

<S23b> When the wireless terminal 300 receives the packet, the wireless terminal 300 transmits an ACK packet #3 to the server 200. Suppose that, at this time, a wait for ACK due to RTT occurs, and the server 200 receives the ACK packet #3 after a delay of a time DL2a from the time when the packet is otherwise intended to be received.

<S24a> The server 200 transmits the packet to the wireless terminal 300 after elapse of a time DL2 from the time when the packet is otherwise intended to be transmitted.

In this case, in a case where there is no wait for ACK due to RTT, the reception interval of the ACK packets #1 and #2 in the network monitoring device 100 is T0.

To the contrary, if a wait for ACK due to RTT occurs, arrival of the ACK packet #3 is delayed. Thus, the reception interval T1 between the ACK packets #2 and #3 in the network monitoring device 100 becomes large in comparison to the reception interval T0 (T0<T1). In this way, the reception interval of ACK packets also increases owing to a wait for ACK due to RTT.

Next, a delay in the arrival of an ACK packet due to a cause at the TCP level will be described. Cases where a packet transmitted from the server 200 is delayed include, for example, packet loss and packet retransmission at the TCP level. Cases where an ACK packet transmitted from the wireless terminal 300 is delayed include, for example, Delayed ACK.

First, the case of packet loss will be described.

Figure 8:
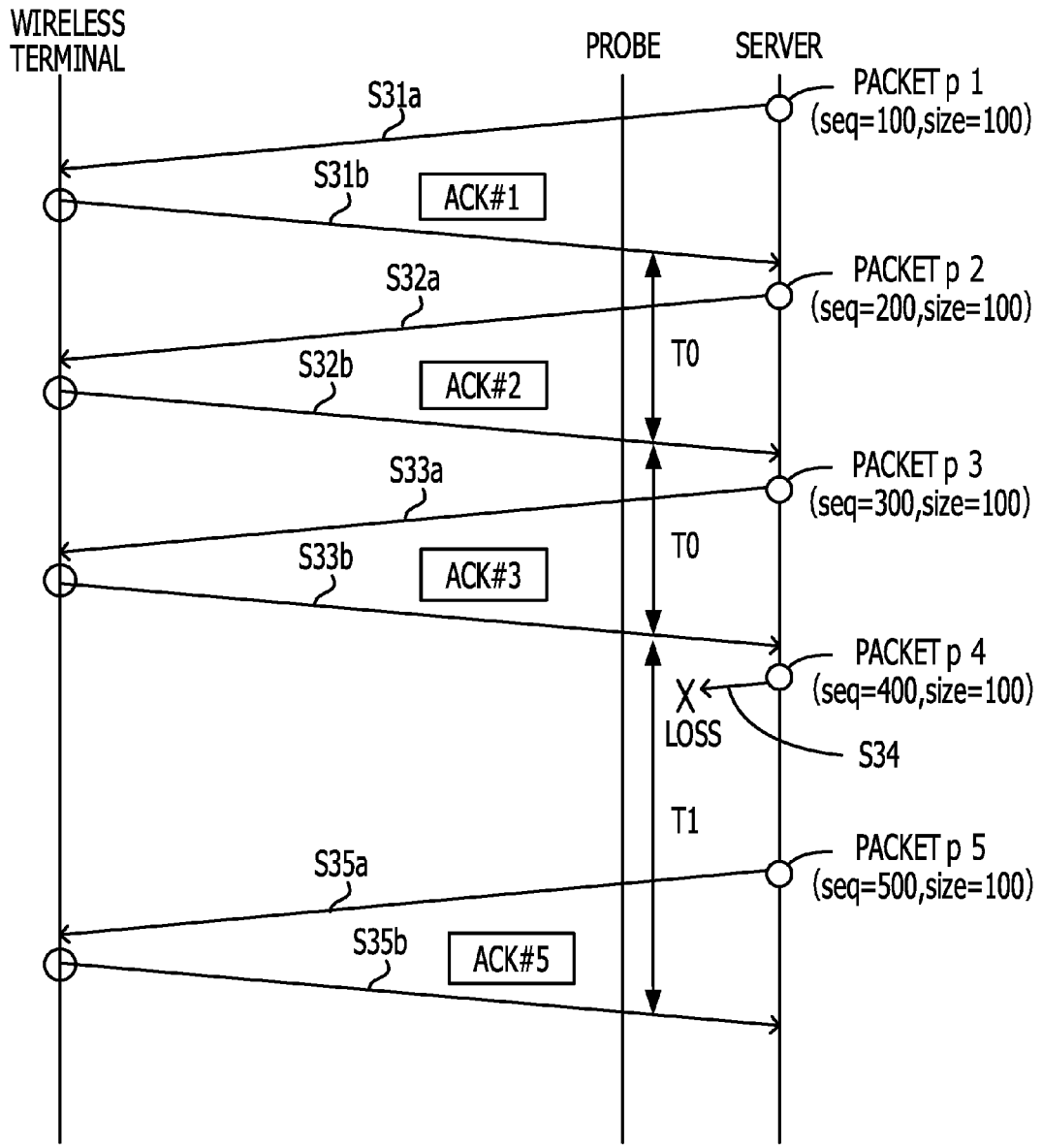
FIG. 8 illustrates an example of an ACK delay due to packet loss according to the second embodiment.

FIG. 8 illustrates an example of an ACK delay due to packet loss according to the second embodiment. Hereinafter, the processing illustrated in FIG. 8 will be described with reference to process numbers.

<S31a> The server 200 transmits a packet p1 (sequence number=100, data size=100) to the wireless terminal 300.

<S31b> When the wireless terminal 300 receives the packet p1, the wireless terminal 300 transmits an ACK packet #1 to the server 200.

<S32a> The server 200 transmits a packet p2 (sequence number=200, data size=100) to the wireless terminal 300.

<S32b> When the wireless terminal 300 receives the packet p2, the wireless terminal 300 transmits an ACK packet #2 to the server 200.

<S33a> The server 200 transmits a packet p3 (sequence number=300, data size=100) to the wireless terminal 300.

<S33b> When the wireless terminal 300 receives the packet p3, the wireless terminal 300 transmits an ACK packet #3 to the server 200.

Since communications have been performed normally in this sequence so far, the reception interval of the ACK packets #1 and #2 and the reception interval of the ACK packets #2 and #3 in the network monitoring device 100 are equal to each other, both being the time interval T0.

<S34> The server 200 transmits a packet p4 (sequence number=400, data size=100) toward the wireless terminal

300. Suppose that, however, the packet p4 is lost on the wired network between the server 200 and the network monitoring device 100.

<S35a> The server 200 transmits a packet p5 (sequence number=500, data size=100) to the wireless terminal 300.

<S35b> When the wireless terminal 300 receives the packet p5, the wireless terminal 300 transmits an ACK packet #5 to the server 200.

At this time, the network monitoring device 100 receives the packet p5 with a sequence number 500, without receiving the packet p4 with a sequence number 400. The network monitoring device 100 thus detects that the packet p4 has been lost. The network monitoring device 100 is able to detect that packet loss has occurred in a case where the network monitoring device 100 receives a packet with a sequence number greater than an expected value.

When packet loss occurs, the reception interval T1 between the ACK packets #3 and #5 becomes greater than the previous reception interval T0. In this way, the reception interval of ACK packets also increases owing to packet loss that is one of causes at the TCP level.

Next, the case of packet retransmission will be described.

Figure 9:
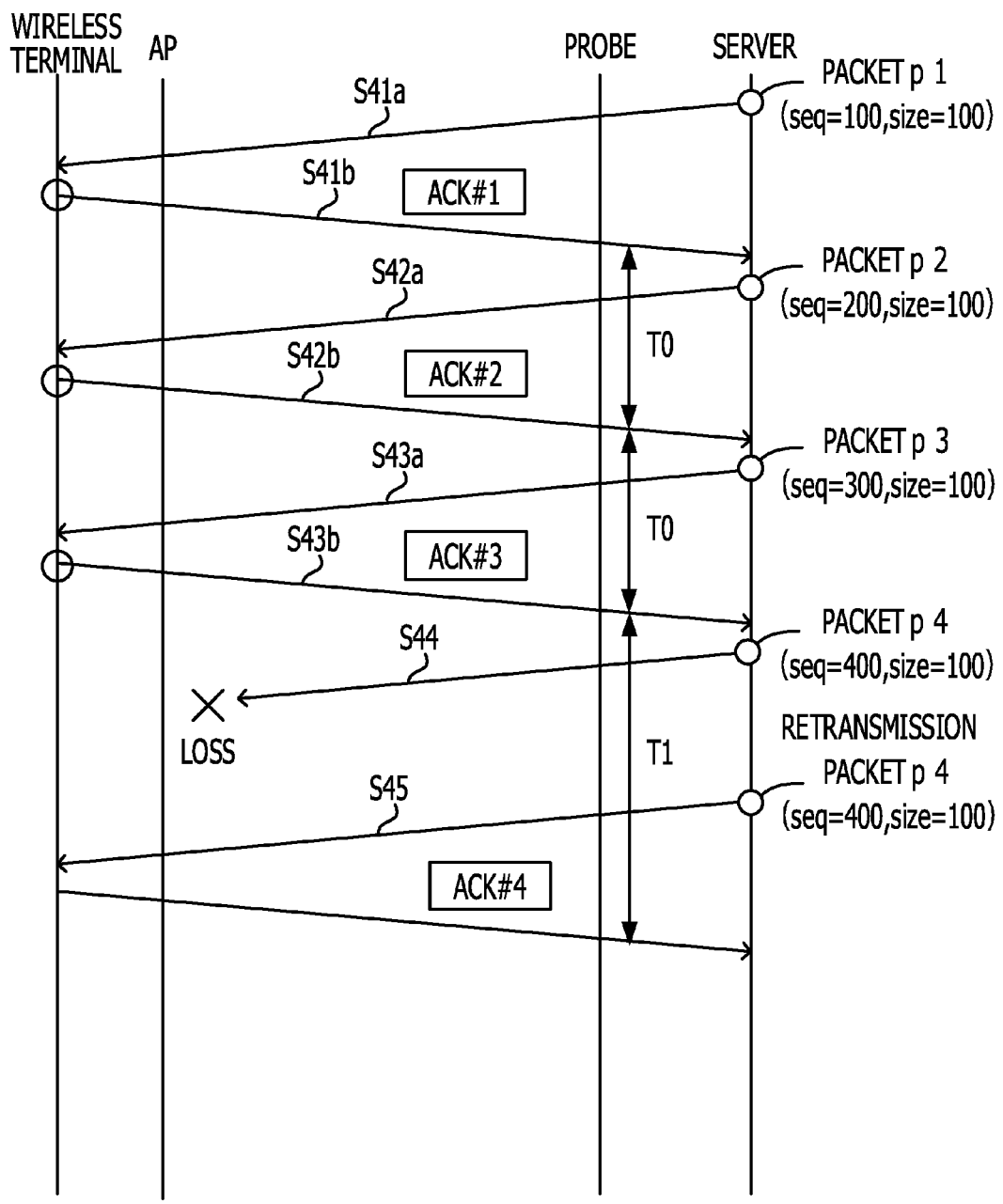
FIG. 9 illustrates an example of an ACK delay due to packet retransmission according to the second embodiment.

FIG. 9 illustrates an example of an ACK delay due to packet retransmission according to the second embodiment. Hereinafter, the processing illustrated in FIG. 9 will be described with reference to process numbers.

<S41a> The server 200 transmits a packet p1 (sequence number=100, data size=100) to the wireless terminal 300.

<S41b> When the wireless terminal 300 receives the packet p1, the wireless terminal 300 transmits an ACK packet #1 to the server 200.

<S42a> The server 200 transmits a packet p2 (sequence number=200, data size=100) to the wireless terminal 300.

<S42b> When the wireless terminal 300 receives the packet p2, the wireless terminal 300 transmits an ACK packet #2 to the server 200.

<S43a> The server 200 transmits a packet p3 (sequence number=300, data size=100) to the wireless terminal 300.

<S43b> When the wireless terminal 300 receives the packet p3, the wireless terminal 300 transmits an ACK packet #3 to the server 200.

Since communications have been performed normally in this sequence so far, the reception interval of the ACK packets #1 and #2 and the reception interval of the ACK packets #2 and #3 in the network monitoring device 100 are equal to each other, both being the time interval T0.

<S44> The server 200 transmits a packet p4 (sequence number=400, data size=100) toward the wireless terminal 300. Suppose that, however, the packet p4 is lost on the wired network between the network monitoring device 100 and the wireless base station 30 (access point).

<S45> Because an ACK packet #4 is not returned, the server 200 retransmits the packet p4 (sequence number=400, data size=100) to the wireless terminal 300 owing to timeout.

The network monitoring device 100 detects that packet retransmission has occurred in a case where the network monitoring device 100 receives a packet with the same sequence number as the previously received packet (the packet p4 in this case). Alternatively, the network monitoring device 100 detects that packet retransmission has occurred also in a case where the network monitoring device 100 receives a packet with a sequence number greater than an expected value.

In a state in which packet retransmission occurs in this way, the reception interval T1 between the ACK packets #3 and #4 becomes large in comparison to the reception interval T0.

Therefore, the reception interval of ACK packets also increases owing to packet retransmission that is one of causes at the TCP level.

Next, the case of Delayed ACK will be described. First, the definition of Delayed ACK will be described. When data is received and an ACK packet is immediately returned at the receiving end, there is a high possibility that the receiving end will return a small window size because the receiving end has just received data (the window size is described in the header). Delay ACK is a scheme for avoiding this situation.

Window size refers to the size of data that may be successfully received at once without waiting for an ACK. The transmitting end adjusts the size of transmit data in accordance with the window size notified from the receiving end.

At the receiving end, immediately after reception of data, there is not much unoccupied buffer space. Therefore, when the receiving end returns an ACK immediately after receiving data, the receiving end may notify a small size as the size of data (window size) transmitted to the transmitting end.

Accordingly, a predetermined period of time is waited for until some free buffer space becomes available, and after elapse of the predetermined period of time, the receiving end notifies the transmitting end of a predetermined transmit data size by the window size, thereby causing a predetermined amount of data to be outputted from the transmitting end.

Figure 10A:
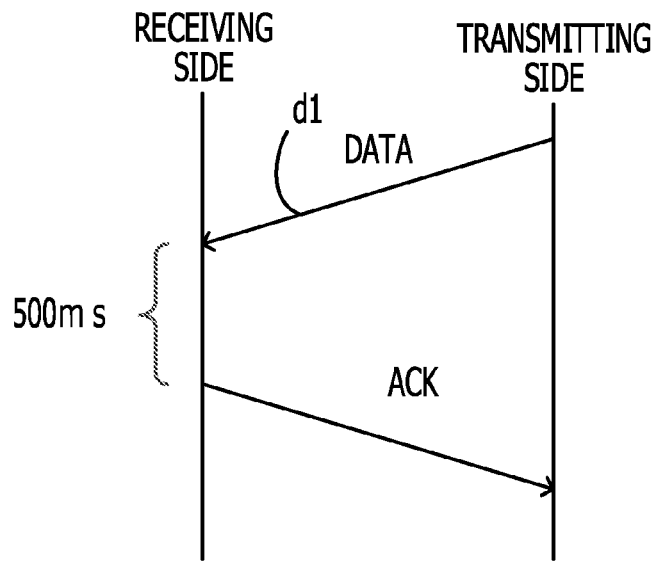
FIGS. 10A and 10B each illustrate an example of Delayed ACK according to the second embodiment.
Figure 10B:
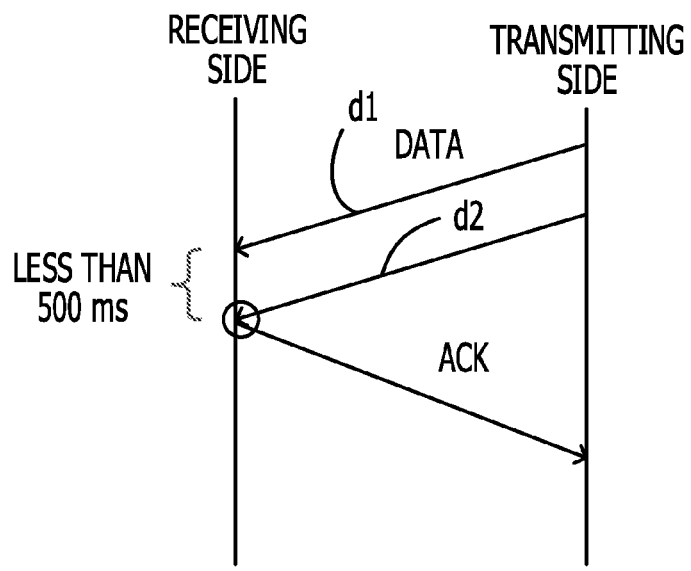

FIGS. 10A and 10B each illustrate an example of Delayed ACK according to the second embodiment. In the sequence illustrated in FIG. 10A, the transmitting end transmits data d1 to the receiving end. When the receiving end receives the data d1, the receiving end returns an ACK packet after elapse of a predetermined period of time (for example, 500 ms).

In the sequence illustrated in FIG. 10B, the transmitting end transmits data d1 to the receiving end, and the receiving end receives the data d1. Further, the transmitting end transmits data d2 to the receiving end. When the receiving end receives the data d2 within a predetermined period of time (for example, 500 ms), the receiving end returns an ACK packet immediately. Strictly speaking, both the case of FIG. 10A and the case of FIG. 10B represent Delayed ACK. However, it is the case of FIG. 10A that affects delay measurement according to the embodiments. Thus, in this specification, the case of FIG. 10A will be hereinafter referred to as Delayed ACK.

Figure 11:
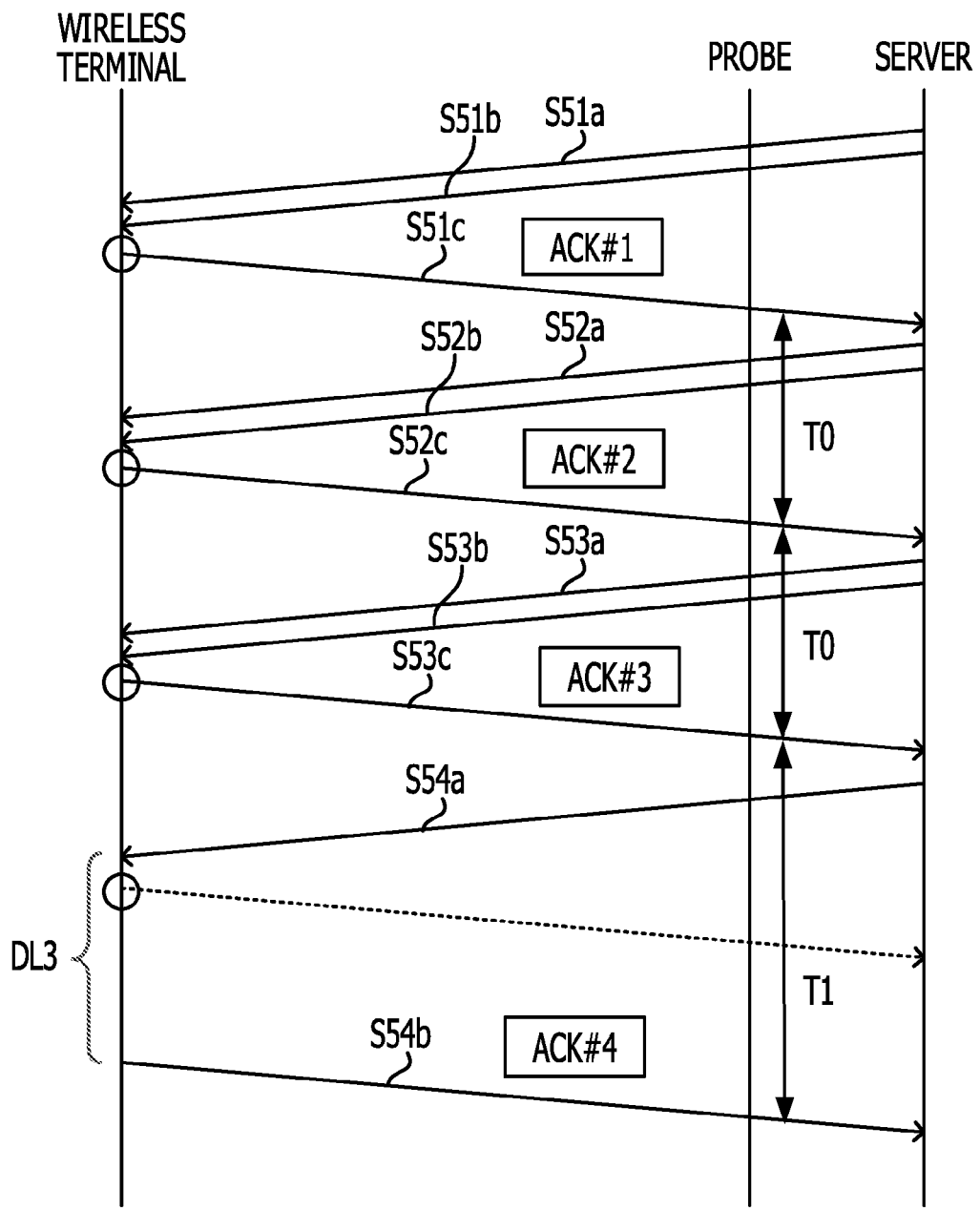
FIG. 11 illustrates an example of an ACK delay due to Delayed ACK according to the second embodiment.

FIG. 11 illustrates an example of an ACK delay due to Delayed ACK according to the second embodiment. It is assumed that when multiple pieces of data arrive continuously, a single ACK is returned for every two pieces of data. Hereinafter, the processing illustrated in FIG. 11 will be described with reference to process numbers.

<S51a> The server 200 transmits a packet toward the wireless terminal 300.

<S51b> The server 200 transmits a packet toward the wireless terminal 300.

<S51c> When the wireless terminal 300 receives the two packets, the wireless terminal 300 transmits an ACK packet #1 to the server 200.

<S52a> The server 200 transmits a packet toward the wireless terminal 300.

<S52b> The server 200 transmits a packet toward the wireless terminal 300.

<S52c> When the wireless terminal 300 receives the two packets, the wireless terminal 300 transmits an ACK packet #2 to the server 200.

<S53a> The server 200 transmits a packet toward the wireless terminal 300.

<S53b> The server 200 transmits a packet toward the wireless terminal 300.

\<S53c\> When the wireless terminal 300 receives the two packets, the wireless terminal 300 transmits an ACK packet #3 to the server 200.

Since communications have been performed normally in this sequence so far, the reception interval of the ACK packets #1 and #2 and the reception interval of the ACK packets #2 and #3 in the network monitoring device 100 are equal to each other, both being the time interval T0.

\<S54a\> The server 200 transmits a packet toward the wireless terminal 300.

\<S54b\> Because the next packet does not arrive, the wireless terminal 300 transmits an ACK packet #4 to the server 200 after elapse of a predetermined time DL3.

Owing to Delayed ACK mentioned above, arrival of the ACK packet #4 is delayed. Thus, the reception interval T1 between the ACK packets #3 and #4 in the network monitoring device 100 becomes large in comparison to the reception interval T0 (T0<T1). In this way, the reception interval of ACK packets also increases owing to Delayed ACK that is one of causes at the TCP level.

Figure 12A:
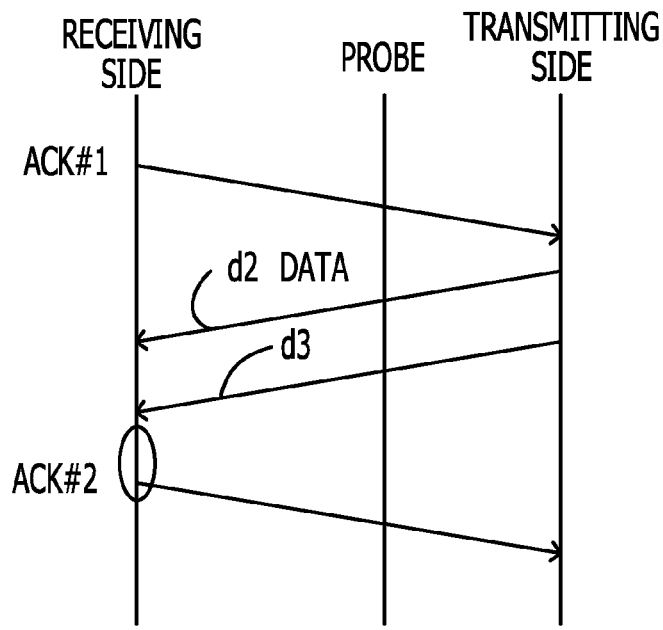
FIGS. 12A and 12B each illustrate an example of detection of Delayed ACK according to the second embodiment.
Figure 12B:
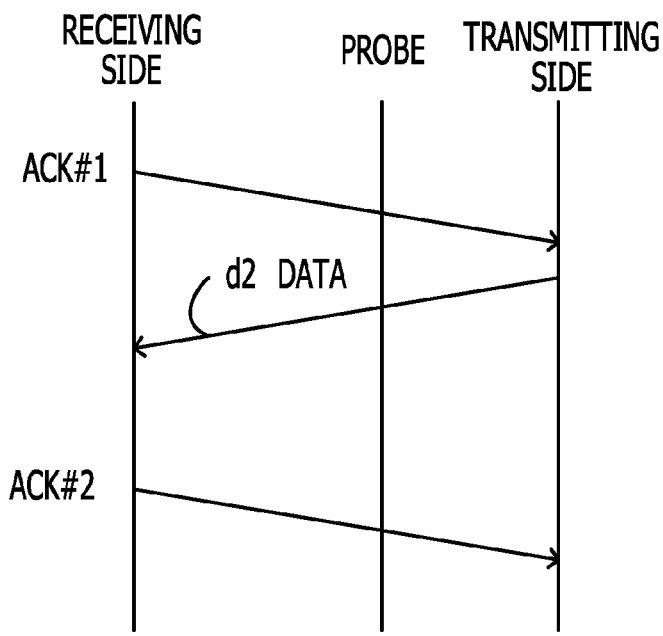

FIGS. 12A and 12B each illustrate an example of detection of Delayed ACK according to the second embodiment. FIG. 12A illustrates a sequence when data arrives continuously. FIG. 12B illustrates a sequence when data arrives with a delay. In FIG. 12A, an ACK is returned immediately for the second piece of data. FIG. 12B illustrates a sequence when data arrives with a delay relative to FIG. 12A.

In FIG. 12A, an ACK packet #1 is returned to the transmitting end from the receiving end. Thereafter, the transmitting end transmits data d2 and data d3 to the receiving end. Then, the receiving end returns an ACK packet #2 to the transmitting end.

In FIG. 12B, an ACK packet #1 is returned to the transmitting end from the receiving end. Thereafter, the transmitting end transmits data d2 to the receiving end. At the receiving end, in a case where the next piece of data does not arrive, the receiving end returns an ACK packet #2 for the data d2 after elapse of a predetermined time.

If an ACK is returned for two pieces of data as in FIG. 12A, the network monitoring device 100 determines that the ACK in question is not Delayed ACK that affects ACK interval. If an ACK is returned for a single piece of data as in FIG. 12B, the network monitoring device 100 determines that the ACK in question is Delayed ACK that affects ACK interval.

Next, a delay in the arrival of an ACK packet due to a cause on the wireless terminal side will be described.

Figure 13:
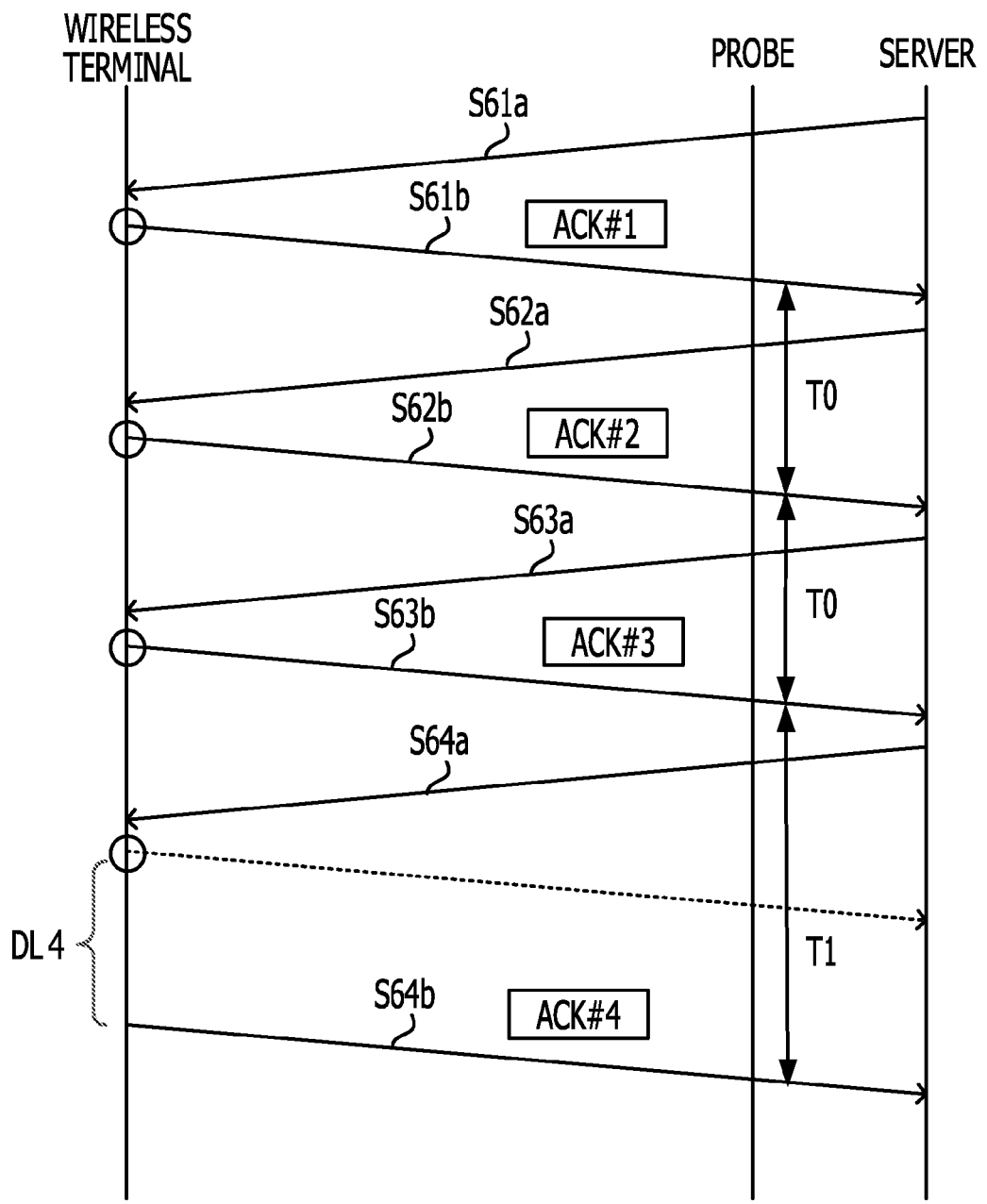
FIG. 13 illustrates an example of an ACK delay due to a wireless terminal factor according to the second embodiment.

FIG. 13 illustrates an example of an ACK delay due to a wireless terminal factor according to the second embodiment. Hereinafter, the processing illustrated in FIG. 13 will be described with reference to process numbers.

\<S61a\> The server 200 transmits a packet toward the wireless terminal 300.

\<S61b\> When the wireless terminal 300 receives the packet, the wireless terminal 300 transmits an ACK packet #1 to the server 200.

\<S62a\> The server 200 transmits a packet toward the wireless terminal 300.

\<S62b\> When the wireless terminal 300 receives the packet, the wireless terminal 300 transmits an ACK packet #2 to the server 200.

\<S63a\> The server 200 transmits a packet toward the wireless terminal 300.

\<S63b\> When the wireless terminal 300 receives the packet, the wireless terminal 300 transmits an ACK packet #3 to the server 200.

Since communications have been performed normally in this sequence so far, the reception interval of the ACK packets #1 and #2 and the reception interval of the ACK packets #2 and #3 in the network monitoring device 100 are equal to each other, both being the time interval T0.

\<S64a\> The server 200 transmits a packet toward the wireless terminal 300.

\<S64b\> For example, a delay occurs in the ACK packet transmission process on the wireless terminal 300, and an ACK packet #4 is transmitted to the server 200 after a delay of a time DL4 from the time when the packet is otherwise intended to be transmitted.

As mentioned above, when a delay occurs in the packet transmission process on the wireless terminal 300 side, arrival of the ACK packet #4 is delayed, and the reception interval T1 between the ACK packets #3 and #4 in the network monitoring device 100 becomes large in comparison to the reception interval T0 (T0<T1).

In this way, the reception interval of ACK packets also increases owing to a cause on the wireless terminal 300 side (for example, a delay in the ACK packet transmission process within the wireless terminal 300).

Next, an operation for determining that a delay is occurring in the wireless section by excluding the four causes of delay mentioned above will be described. As for the following causes of delay: a cause on the server side, a wait for ACK due to RTT, and a cause at the TCP level, not only the reception interval of ACK packets is analyzed but also the DATA packets transmitted from the server 200 to the wireless terminal 300, which have triggered the transmission of ACK packets, will be analyzed.

Specifically, the network monitoring device 100 performs packet capture for ACK packets returned for three or more continuous normal packets, and the network monitoring device 100 determines that a delay is occurring in the wireless section based on the reception interval of ACK packets that has been measured.

In this regard, in order to determine that a delay is occurring in the wireless section by excluding a cause on the server side, a wait for ACK due to RTT, and a cause at the TCP level, there are three following conditions.

That is, the following three conditions have to be satisfied simultaneously: "Three or more DATA packets are transmitted", "DATA packets are continuous DATA packets", and "A delay at the TCP level is not occurring". Each of those three conditions will be described below.

(a) With regard to the condition that three or more DATA packets are transmitted In order to recognize the reception interval for a single ACK packet, two or more ACK packets are to be returned. Because a single ACK packet is normally returned for every two DATA packets, if three or more DATA packets are transmitted, the reception interval for at least one ACK packet may be recognized.

(b) With regard to the condition that DATA packets are continuous DATA packets

Even in a case where three or more DATA packets are transmitted, if there is no continuity between those DATA packets, it is not possible to exclude a cause on the server side, a wait for ACK due to RU, and a cause at the TCP level. Therefore, the DATA packets in question have to be continuous packets. The determination as to whether or not DATA packets are continuous DATA packets depends on whether the data size of the DATA packets is fixed or variant.

In a case where the data size of DATA packets is fixed, if the transmission interval of the DATA packets is less than or equal to a threshold, it is determined that these DATA packets have continuity. In a case where the data size of DATA packets is variant, if the transmission speed of the DATA packets is greater than or equal to a threshold, it is determined that these DATA packets have continuity. The transmission speed of DATA packets is calculated as (DATA packet transmission interval)/(DATA packet data size).

(c) With regard to the condition that a delay at the TCP level is not occurring

Specific examples of cases where a delay at the TCP level occurs include when a DATA packet is lost, when a DATA packet is retransmitted, and Delayed ACK of an ACK packet.

Figure 14:
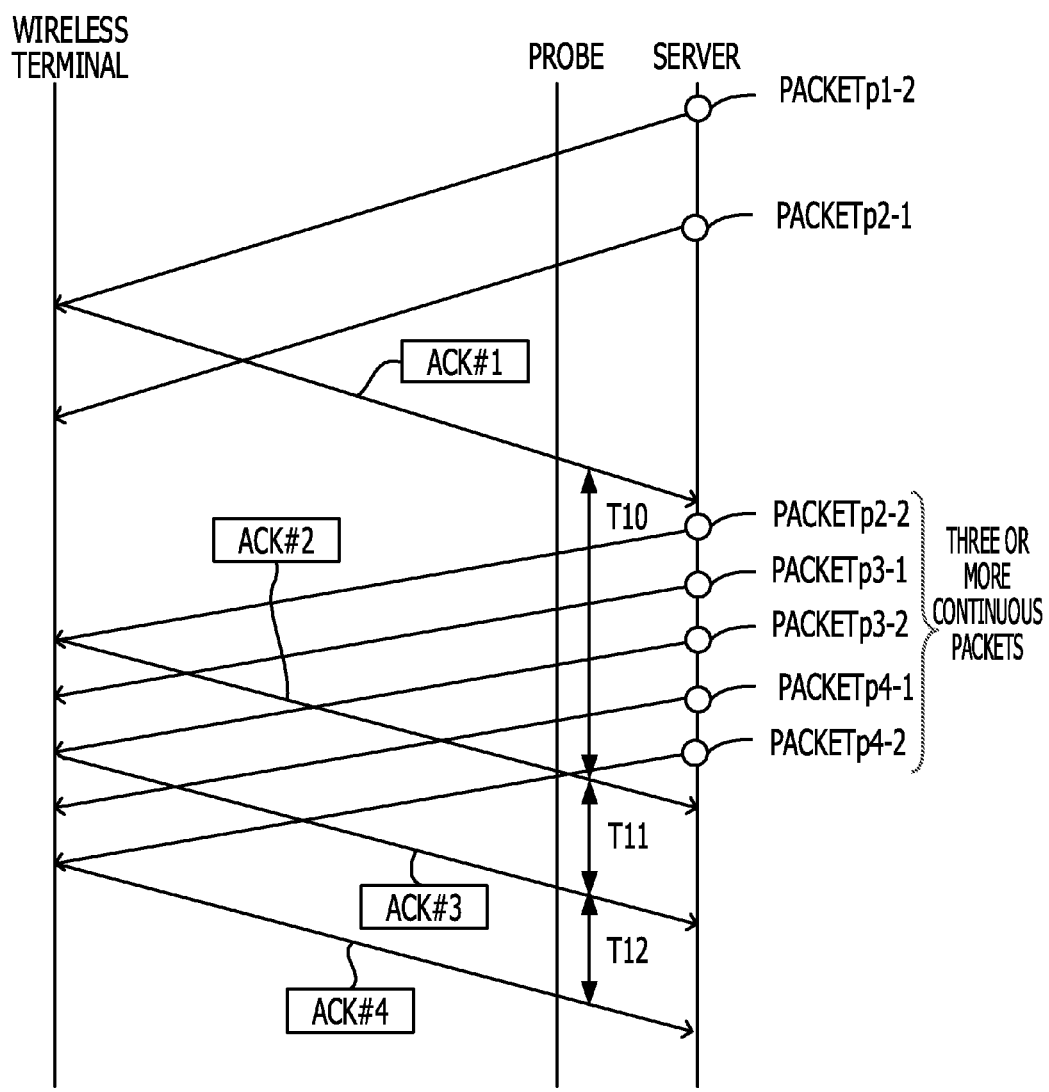
FIG. 14 illustrates ACK intervals for continuous DATA packets according to the second embodiment.

FIG. 14 illustrates ACK intervals for continuous DATA packets according to the second embodiment. FIG. 14 illustrates a case where a single ACK is returned for every two packets.

Suppose that packets p1-2, p2-1, p2-2, p3-1, p3-2, p4-1, and p4-2 (which are all normal packets) are transmitted to the receiving end from the transmitting end, and the packets p2-2, p3-1, p3-2, p4-1, and p4-2 have continuity.

An ACK packet #1 is an acknowledgement packet for the packet p1-2, and an ACK packet #2 is an acknowledgement packet for the packet p2-2. An ACK packet #3 is an acknowledgement packet for the packet p3-2, and an ACK packet #4 is an acknowledgement packet for the packet p4-2.

Now, the packets p2-2, p3-2, and p4-2 have continuity. Therefore, an ACK reception interval T11 between the ACK packet #2 returned for the packet p2-2, and the ACK packet #3 returned for the packet p3-2, and an ACK reception interval T12 between the ACK packet #3, and the ACK packet #4 returned for the packet p4-2 are subject to analysis.

The packets p1-2 and the packet p2-2 are not continuous. Therefore, an ACK reception interval T10 between the ACK packet #1 returned for the packet p1-2, and the ACK packet #2 returned for the packet p2-2 are not subject to analysis.

Next, the retransmission period on the wireless terminal 300 side will be described. In wireless communication on the wireless terminal 300, when performing retransmission, depending on the wireless line type, retransmission at the Layer 2 (L2) level is performed at regular intervals.

Therefore, in the network monitoring device 100, when ACK packets are received at intervals that do not coincide with the retransmission period on wireless communication, it is recognized that a delay is occurring in the transmission process on the wireless terminal 300 side. That is, it is determined that there is a possibility of a delay occurring owing to a cause on the wireless terminal side.

In the network monitoring device 100, when ACK packets are received at intervals that substantially coincide with the packet retransmission period on wireless communication, it is recognized that a loss in the wireless section as illustrated as FIG. 5 or the like has occurred in the wireless section, and the wireless terminal 300 has retransmitted the packet.

That is, the network monitoring device 100 determines that a delay is occurring in the wireless section, in a case where the network monitoring device 100 receives ACK packets at intervals that substantially coincide with the packet retransmission period on wireless communication.

Figure 15:
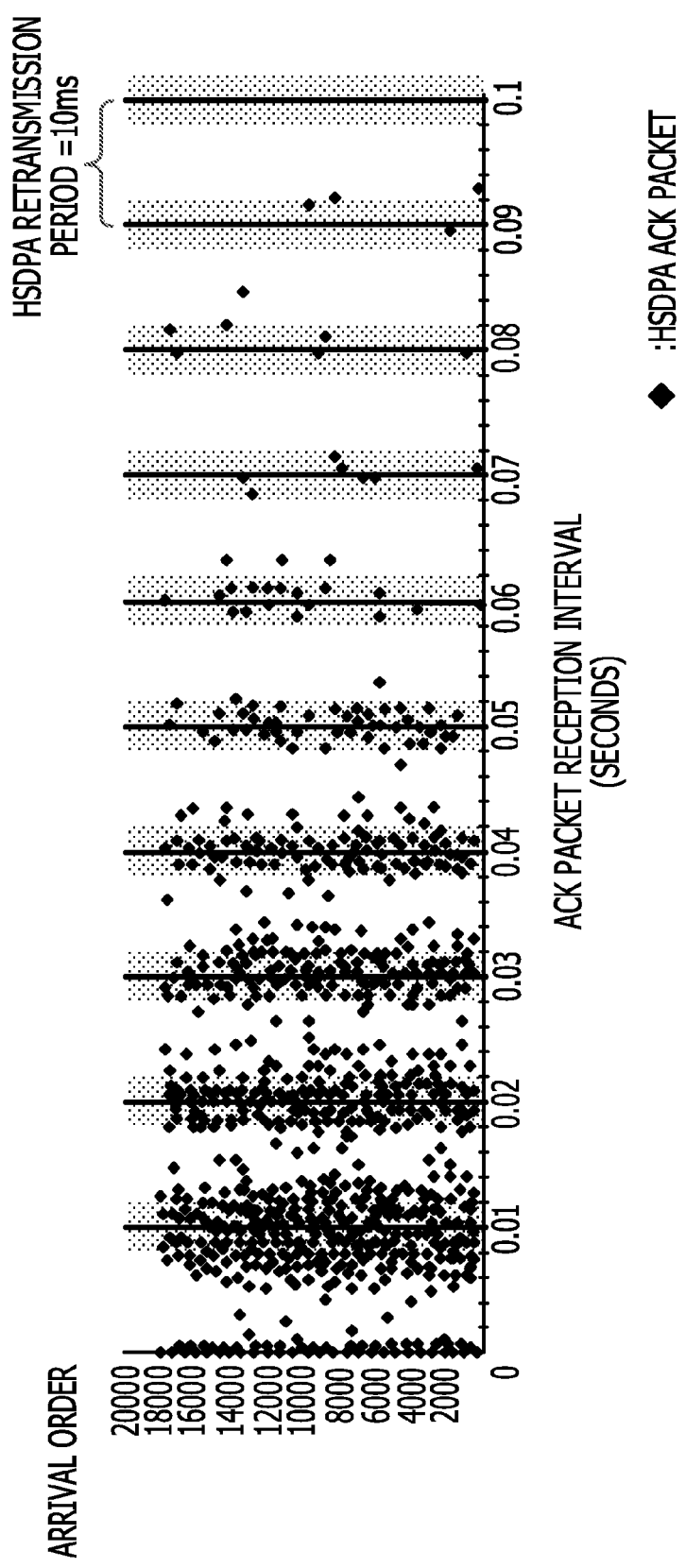
FIG. 15 illustrates ACK packet reception intervals according to the second embodiment.

FIG. 15 illustrates ACK packet reception intervals according to the second embodiment. The horizontal axis represents the reception interval (seconds) between ACK packets received by the network monitoring device 100, and the vertical axis represents the arrival order of ACK packets.

FIG. 15 illustrates an example of wireless retransmission period in High Speed Downlink Packet Access (HSDPA). The retransmission period in HSDPA is normally every 10 ms. Therefore, when retransmission occurs in the wireless section, the ACK packet reception interval is every 10 ms. However, in actuality, the interval is subject to fluctuations of several ms.

Accordingly, provided that, for example, there are fluctuations of ±2 ms, if the network monitoring device 100 receives ACK packets at intervals that fall within a range of 10 ms×N±2 ms (N=1, 2, 3, . . . ), it may be recognized that ACK packets are being transmitted in accordance with the retransmission period.

That is, if the network monitoring device 100 receives ACK packets at intervals that fall within the range of 10 ms×N±2 ms (N=1, 2, 3, . . . ), it may be recognized that retransmission has occurred in the wireless section, and a delay is occurring in the wireless section. If the network monitoring device 100 receives ACK packets at intervals that fall outside the range of 10 ms×N±2 ms, the network monitoring device 100 determines that there is a possibility of a delay occurring owing to a cause on the wireless terminal side.

Next, a general operation (network analysis method) of the network monitoring device 100 will be described with reference to a flowchart.

Figure 16:
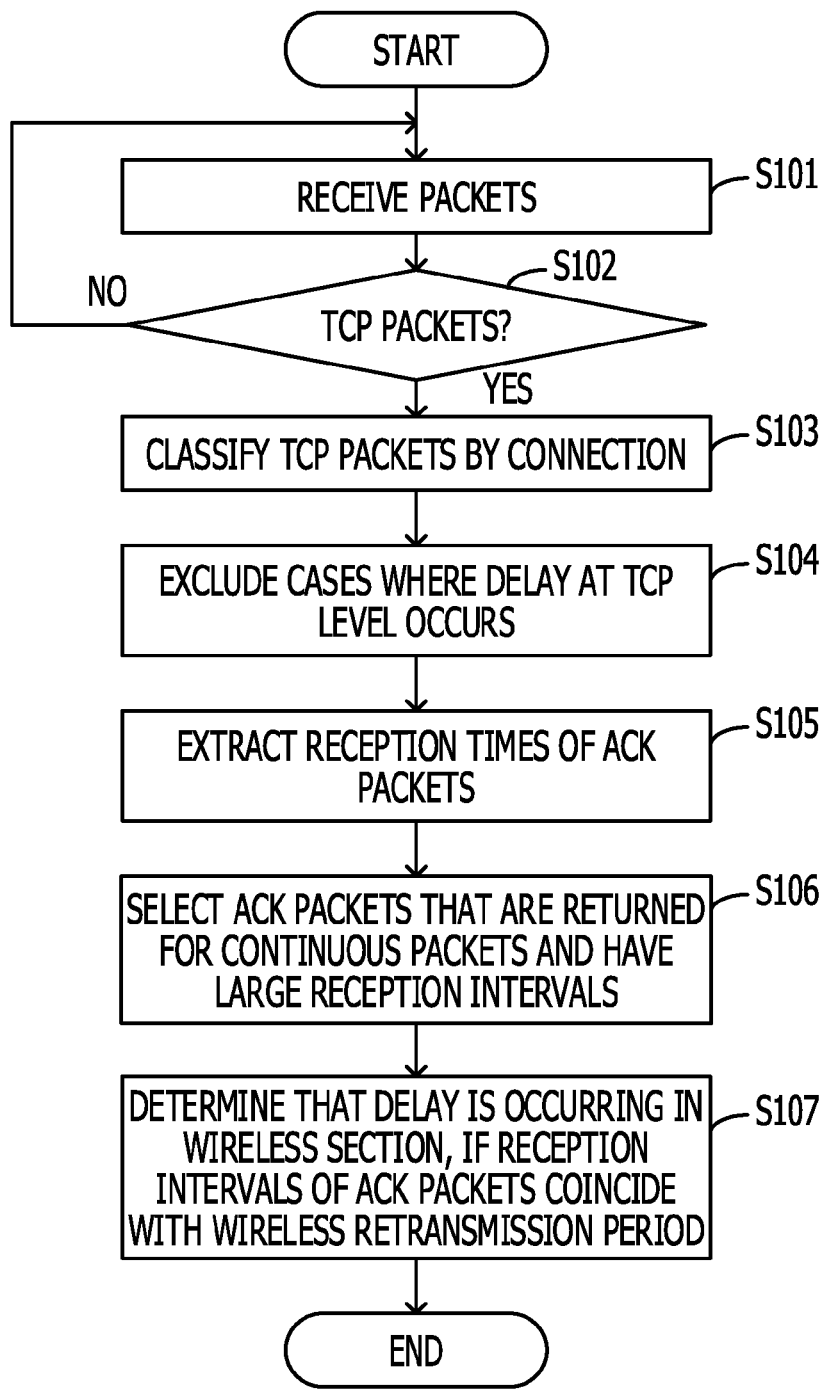
FIG. 16 is a flowchart illustrating a general operation according to the second embodiment.

FIG. 16 is a flowchart illustrating a general operation according to the second embodiment. Hereinafter, the processing illustrated in FIG. 16 will be described with reference to process numbers.

<S101> The receiver 120 of the network monitoring device 100 receives packets.

<S102> The controller 130 of the network monitoring device 100 determines whether or not the received packets are TCP packets. The controller 130 transfers to S103 in a case where the received packets are TCP packets. The controller 130 returns to S101 in a case where the received packets are not TCP packets.

<S103> The controller 130 classifies packets by connection. The processes described below are performed for each connection. A connection may be identified by the combination of the source/destination IP address and source/destination port number included in each packet.

<S104> The controller 130 excludes an ACK packet from analysis in a case where the ACK packet is delayed for a cause at the TCP level.

Specifically, the controller 130 determines that packet loss has occurred in a case where the controller 130 receives a DATA packet with a sequence number greater than an expected value. Consequently, an ACK packet returned for the DATA packet with a sequence number greater than an expected value is excluded from analysis.

For example, in FIG. 8 mentioned above, the network monitoring device 100 receives the packet p5 with a sequence number 500, as opposed to an expected sequence number 400. Therefore, the ACK packet #5 returned for the packet p5 is determined as not being a response to a normal packet, and excluded from analysis.

The controller 130 detects that packet retransmission has occurred in a case where the controller 130 receives a DATA packet with the same sequence number as the previously received DATA packet. Consequently, the controller 130 excludes from analysis an ACK packet returned for the DATA packet with the same sequence number as the previously received DATA packet.

For example, in FIG. 9 mentioned above, the network monitoring device 100 receives the packet p4 with a sequence number 400 twice. Therefore, the controller 130 determines that the packet p4 received in S45 is not a response to a normal packet. Then, the controller 130 excludes the ACK packet #4 for the packet p4 from analysis.

Further, the controller 130 excludes an ACK packet delayed owing to Delayed ACK from analysis. Since how to determine whether or not an ACK packet is a packet delayed owing to Delayed ACK has been already described with reference to FIGS. 12A and 12B, a description in this regard is omitted.

<S105> The controller 130 extracts reception times of packets.

<S106> The controller 130 selects ACK packets that are returned for continuous DATA packets and have large reception intervals.

<S107> The controller 130 determines that a delay is occurring in the wireless section if, among the selected ACK packets, the reception intervals of the ACK packets coincide with the wireless retransmission period.

Next, the determination method in S106 mentioned above will be described in detail. There are two methods as the determination method in S106.

Figure 17:
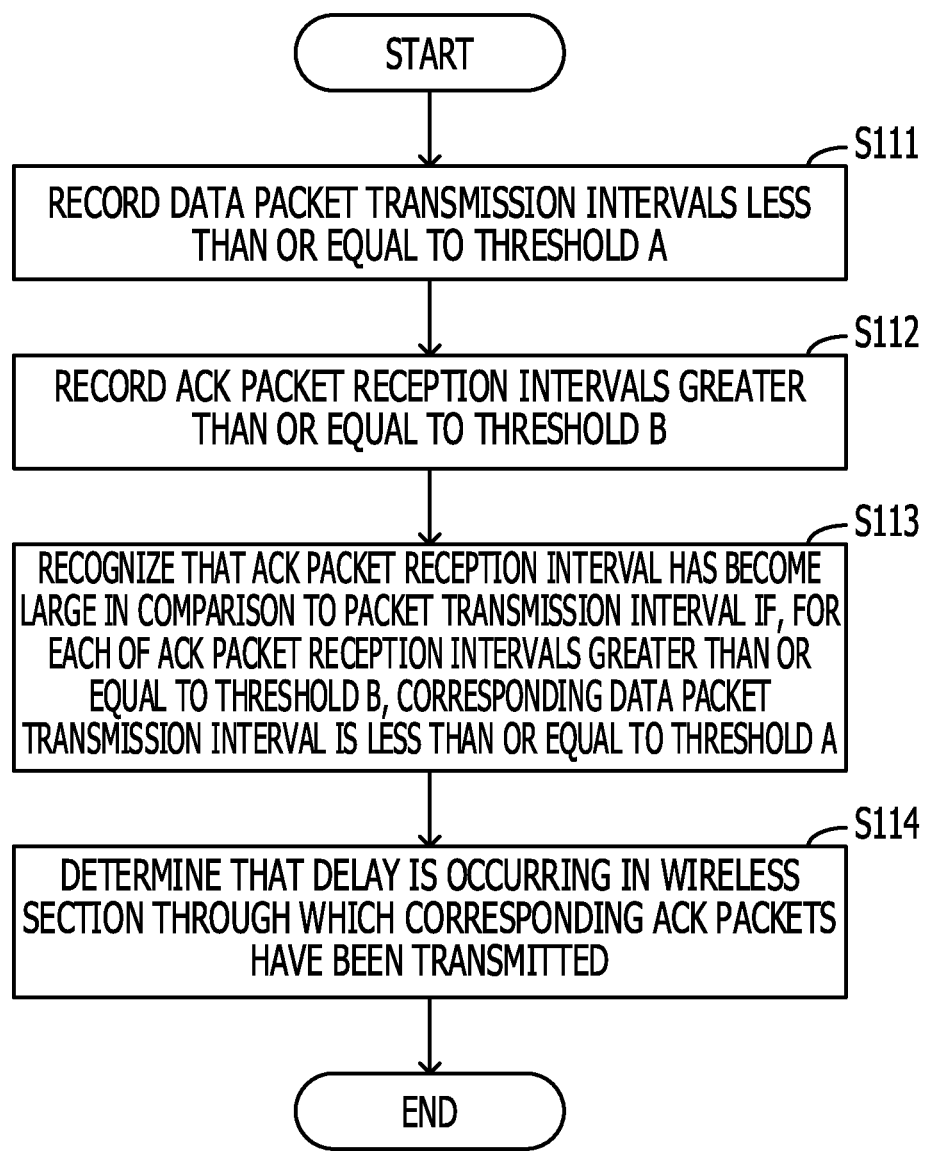
FIG. 17 is a flowchart illustrating a (first) determination method according to the second embodiment.

FIG. 17 is a flowchart illustrating a (first) determination method according to the second embodiment. Hereinafter, the processing illustrated in FIG. 17 will be described with reference to process numbers.

<S111> The controller 130 records DATA packets transmission intervals that are less than a threshold A (first threshold).

<S112> The controller 130 records ACK packet reception intervals that are greater than a threshold B (second threshold).

<S113> The controller 130 recognizes that the reception interval of ACK packets has become large in comparison to the transmission interval of the corresponding DATA packets, in a case where, for each of the reception intervals of ACK packets greater than the threshold B, the transmission interval of DATA packets corresponding to those ACK packets is less than the threshold A.

<S114> When the controller 130 determines that the reception interval of ACK packets has become large, the controller 130 determines that a delay is occurring in the wireless section through which the corresponding ACK packets have been transmitted.

In this regard, in both of the case of an arrival delay of an ACK packet due to a cause on the server 200 and the case of an arrival delay of an ACK packet caused by a wait for ACK due to RTT, the packet transmission interval becomes large on the server 200 side as described above with reference to FIGS. 6 and 7.

Therefore, by analyzing ACK packet reception intervals corresponding to packet transmission interval that are less than or equal to a predetermined value as in the first determination method, both an ACK packet arrival delay due to a cause on the server 200 and an ACK packet arrival delay caused by a wait for ACK due to RTT may be excluded. The thresholds A and B may be determined so that in S111 and S112, it is determined whether or not the reception interval are less than or equal to the threshold A and whether or not the transmission interval are greater than or equal to the threshold B. In S113, the reception interval of ACK packets may be recognized as having become large in comparison to the DATA packet transmission interval in a case where the ACK reception interval is greater than or equal to the threshold B and the transmission interval of the corresponding DATA packets is less than or equal to the threshold A.

Figure 18:
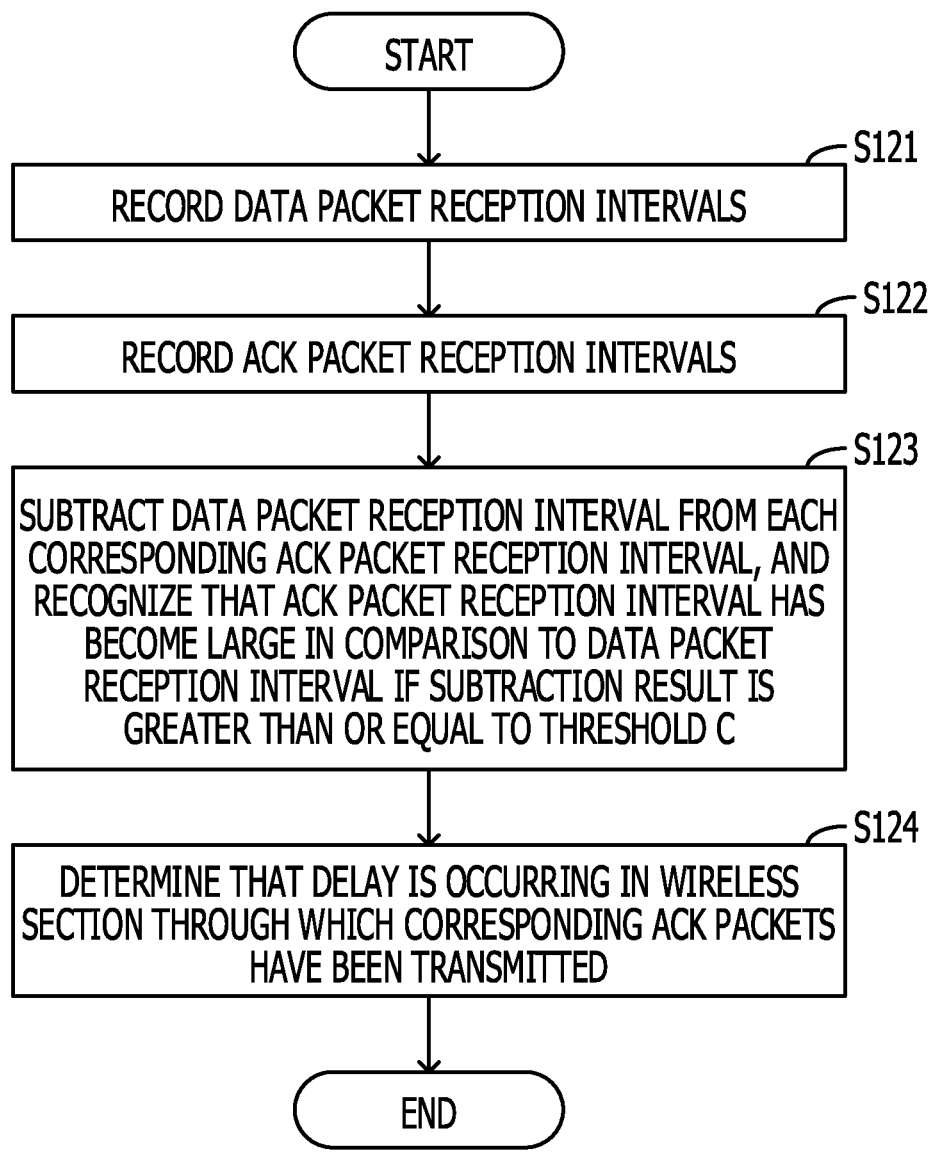
FIG. 18 is a flowchart illustrating a (second) determination method according to the second embodiment.

FIG. 18 is a flowchart illustrating a (second) determination method according to the second embodiment. Hereinafter, the processing illustrated in FIG. 18 will be described with reference to process numbers.

<S121> The controller 130 records DATA packet reception intervals.

<S122> The controller 130 records ACK packet reception intervals.

<S123> The controller 130 subtracts, from each of the reception intervals of ACK packets, the reception interval of DATA packets corresponding to those ACK packets, and in a case where the subtraction result is greater than or equal to a threshold C (third threshold), the controller 130 recognizes that the reception interval of ACK packets has become large in comparison to the DATA packet reception interval. The threshold C is determined as follows: (threshold C)=(threshold B)−(threshold A).

<S124> When the controller 130 determines that the reception interval of ACK packets has become large, the controller 130 determines that a delay is occurring in the wireless section through which the corresponding ACK packets have been transmitted.

According to the second determination method as well, by analyzing ACK packet reception intervals corresponding to DATA packet reception intervals that are less than or equal to a predetermined value, both an ACK packet arrival delay due to a cause on the server 200 and an ACK packet arrival delay caused by a wait for ACK due to RTT may be excluded.

Each of the thresholds A and B, or the threshold C mentioned above is determined either statically or dynamically. In the case of static determination, the threshold is determined in advance, and in the case of dynamic determination, the threshold is determined during analysis. In S123, the threshold C may be determined so that the reception interval of ACK packets is determined to have become large in comparison to the DATA packet reception interval in a case where the subtraction result is greater than or equal to the threshold C.

Hereinafter, a general flow in the case of dynamic threshold determination will be described (a description of a general flow in the case of static determination is omitted because in this case, it simply suffices to perform a process of determining a fixed threshold in advance prior to, for example, S101 in FIG. 16).

Figure 19:
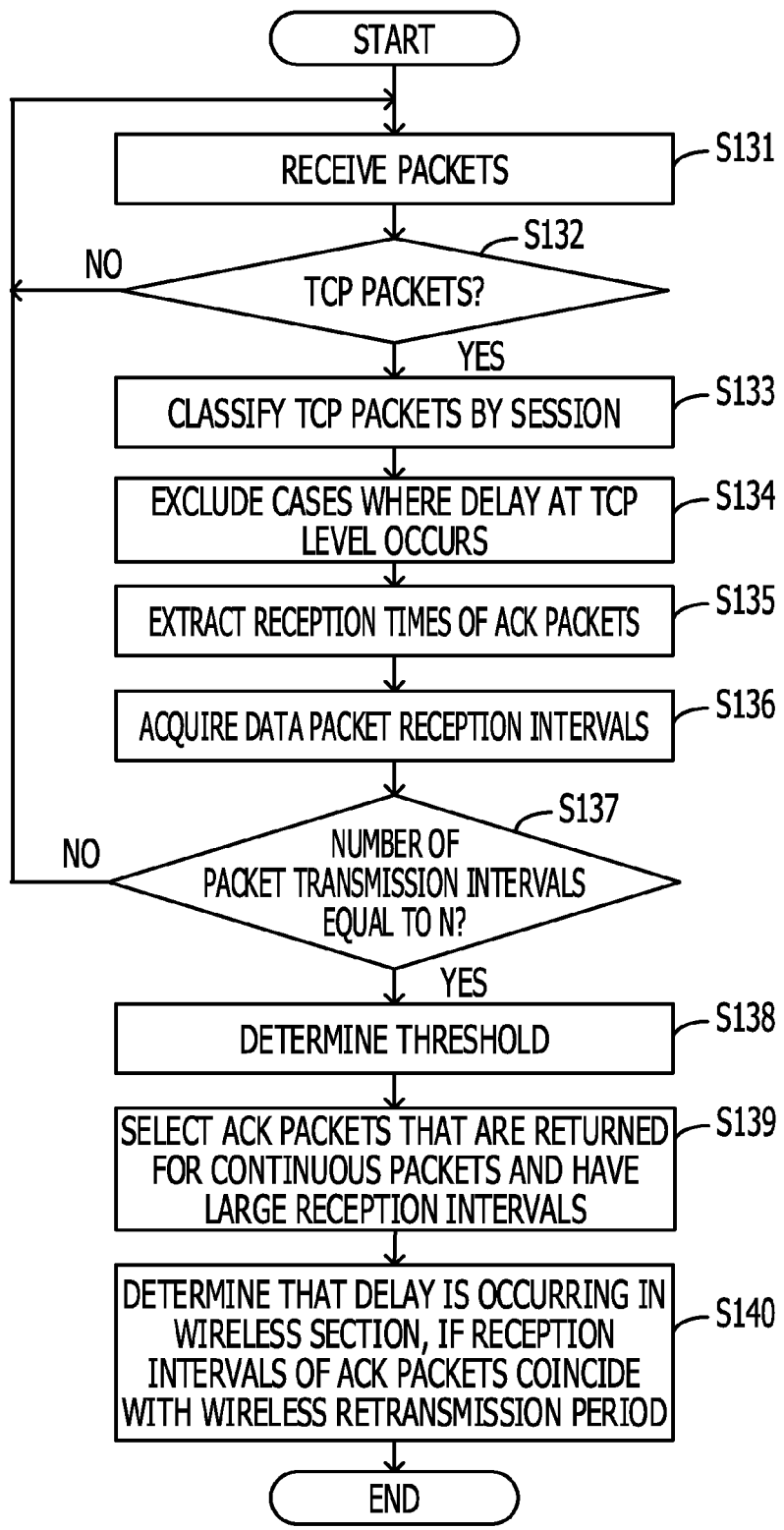
FIG. 19 is a flowchart illustrating another example of a general operation according to the second embodiment.

FIG. 19 is a flowchart illustrating another example of a general operation according to the second embodiment. FIG. 19 illustrates a general flow in the case of performing dynamic threshold determination. Hereinafter, the processing illustrated in FIG. 19 will be described with reference to process numbers.

<S131> The receiver 120 receives packets.

<S132> The controller 130 determines whether or not the received packets are TCP packets. The controller 130 transfers to S133 in a case where the received packets are TCP packets. The controller 130 returns to S131 in a case where the received packets are not TCP packets.

<S133> The controller 130 classifies packets by session. The processes described below are performed for each session.

<S134> The controller 130 excludes an ACK packet from analysis in a case where the ACK packet is delayed for a cause at the TCP level.

<S135> The controller 130 extracts reception times of ACK packets.

<S136> The controller 130 acquires reception intervals of DATA packets.

<S137> The controller 130 proceeds to S138 once n (n is an integer greater than or equal to 1) packet transmission intervals have been acquired from the beginning of a session, and returns to S131 when the number of packet transmission intervals acquired is less than n.

<S138> The controller 130 determines each of the thresholds A and B, or the threshold C (the specific example of threshold determination will be described later).

<S139> The controller 130 selects ACK packets that are returned for continuous DATA packets and have large reception intervals.

<S140> The controller 130 determines that a delay is occurring in the wireless section if, among the selected ACK packets, the reception intervals of ACK packets coincide with the wireless retransmission period.

Next, the method of determining a threshold will be described. First, a case where a threshold is determined statically will be described. As for the threshold A, the threshold A is determined based on the bandwidth (speed) of the network (the network 10 in FIG. 2) at the packet transmitting end.

For example, if 1500 bytes of packet data are to be transmitted continuously from a network with a bandwidth of 100 Mbps, the minimum packet transmission interval is 120 μs (speed=data size/transmission interval). Then, to allow for a margin, the minimum transmission interval is set to an integer multiple (the value of the integer multiple is arbitrary).

Accordingly, if the network bandwidth is 100 Mbps, and the integer multiple is four, then 100 Mbps→120 μs×4=480 μs. Therefore, the threshold A for the packet transmission interval is determined as 480 μs.

Like the threshold A, the threshold B is also determined based on the bandwidth (speed) of the network at the DATA packet receiving end.

For example, if the bandwidth of a network at the DATA packet receiving end is 1 Mbps, and 1500 bytes of DATA packet data are to be transmitted continuously, the minimum ACK packet reception interval for ACK packets corresponding to the DATA packets is 12 ms. Then, to allow for a margin, the minimum ACK packet reception interval is set to an integer multiple (the value of the integer multiple is arbitrary).

Accordingly, if the network bandwidth is 1 Mbps, and the integer multiple is four, then 1 Mbps→12 ms×4=48 ms. Therefore, the threshold B for the ACK packet reception interval is determined as 48 ms.

Next, the case of determining a threshold dynamically will be described. An integer multiple of the smallest value among n packet transmission intervals acquired from the beginning of a session to the n-th packet transmission interval is set as the threshold A (n or the value of the integer is adjusted as appropriate in accordance with the precision of analysis). For example, the smallest value among 10 packet transmission intervals acquired from the beginning of a session is multiplied by four, and the resulting value is set as the threshold A.

Like the threshold A, an integer multiple of the smallest value among n ACK packet reception intervals acquired from the beginning of a session to the n-th ACK packet reception interval is set as the threshold B.

For example, the smallest value among 10 ACK packet reception intervals acquired from the beginning of a session is multiplied by four, and the resulting value is set as the threshold B. The threshold C is determined as (threshold C)= (threshold B)−(threshold A) for both the cases of static determination and dynamic determination.

Next, dynamic determination of the threshold A will be described by way of a specific example.

FIG. 20 illustrates an example of DATA packets according to the second embodiment. A packet list table Ta1 is a table in which various attributes related to packet data transmitted from the server 200 and acquired by the network monitoring device 100 are registered.

The packet list table Ta1 includes the following attribute items: No., TIME, DELTA, Source Address (SA), Source Port (SP), Destination Address (DA), Destination Port (DP), Protocol, SIZE, and SEQence (SEQ).

TIME denotes packet data reception time, which is recorded down to units of 1 μs in addition to year, month, day, hour, and second. DELTA denotes the reception time interval from the last piece of packet data received.

SA denotes source IP address (the IP address "11.22.111.222" of the server 200). SP denotes source port number (80). DA denotes destination IP address (the IP address "11.22.222.111" of the wireless terminal 300). DP denotes destination port number (39916).

Protocol denotes the name of the communication protocol used (TCP in FIG. 20). SIZE denotes packet data size (bytes). SEQ denotes the sequence number of TCP attached to packet data.

At the start of communication by TCP, a three-way handshake is conducted between the server 200 and the wireless terminal 300, thereby establishing a connection between the server 200 and the wireless terminal 300.

As a three-way handshake, specifically, (a1: transmission of a connection request from the wireless terminal 300 to the server 200) (b1: transmission of a connection request and an acknowledgement from the server 200 to the wireless terminal 300)→(a2: transmission of an acknowledgement from the wireless terminal 300 to the server 200) are performed, and a connection is established.

Further, after (a3: transmission of a Hyper Text Transfer Protocol (HTTP) request from the wireless terminal 300 to the server 200) (b2: transmission of a HTTP response from the server 200 to the wireless terminal 300) are performed, real packets are transmitted from the server 200 to the wireless terminal 300.

The transmission of the packet No. 16 in the packet list table Ta1 corresponds to the (b1: transmission of an acknowledgment from the server 200 to the wireless terminal 300) mentioned above. The transmission of the packet No. 16 in the packet list table Ta1 corresponds to the (b2: transmission of a HTTP response from the server 200 to the wireless terminal 300) mentioned above. Accordingly, real packets are transmitted from the server 200 to the wireless terminal 300 from the packet No. 20 onwards.

Dynamically determining the threshold A means determining the threshold A as an integer multiple of the smallest value among n packet transmission intervals acquired from the beginning of a session to the n-th packet transmission interval. Accordingly, provided that n=10, 10 packet transmission intervals acquired from the beginning of a session to the tenth packet transmission interval in this example are packet transmission intervals indicated by Nos. 21, 23, 24, 26, 27, 29, 30, 32, 33, and 35 (inside the thick line in FIG. 20). The smallest value among these packet transmission intervals is 100 μs corresponding to No. 24. Therefore, provided that this value is to be multiplied by four as an integer, the threshold A becomes 400 μs.

Next, dynamic determination of the threshold B will be described by way of a specific example.

FIG. 21 illustrates an example of ACK packets according to the second embodiment. A packet list table Ta2 is a table in which various attributes related to ACK packets acquired by the network monitoring device 100 are registered.

The packet list table Ta2 includes the following attribute items: No., TIME, DELTA, Source Address (SA), Source Port (SP), Destination Address (DA), Destination Port (DP), Protocol, SIZE, and ACK.

TIME denotes ACK packet reception time, which is recorded down to units of 1 μs in addition to year, month, day, hour, and second. DELTA denotes the reception time interval from the last ACK packet received.

SA denotes source IP address (the IP address "11.22.222.111" of the wireless terminal 300). SP denotes source port number (39916). DA denotes destination IP address (the IP address "11.22.111.222" of the server 200). DP denotes destination port number (80).

Protocol denotes the name of the communication protocol used (TCP in FIG. 20). SIZE denotes ACK packet size (bytes). ACK denotes the ACK number of TCP attached to an ACK packet.

The reception of the packet No. 15 in the ACK packet list table Ta2 corresponds to (a1: transmission of a connection request from the wireless terminal 300 to the server 200) in the three-way handshake mentioned above. The reception of the packet No. 17 corresponds to (a2: transmission of an acknowledgement from the wireless terminal 300 to the server 200). The reception of the packet No. 18 corresponds to (a3: transmission of a HTTP request from the wireless terminal 300 to the server 200).

Dynamically determining the threshold B means determining the threshold B as an integer multiple of the smallest value among n ACK packet reception intervals acquired from the beginning of a session to the n-th ACK packet reception interval. Accordingly, provided that n=10, 10 ACK packet reception intervals acquired from the beginning of a session to the tenth ACK packet reception interval in this example are ACK packet reception intervals indicated by Nos. 22, 25, 28, 31, 34, 37, 40, 43, 46, and 49 (inside the thick line in FIG. 21).

The smallest value among these ACK packet reception intervals is 9335 μs corresponding to No. 34. Therefore, provided that this value is to be multiplied by four as an integer, the result becomes 37340 μs. Thus, the threshold B becomes approximately 37 ms.

Next, the proportion of a delay due to a cause on the wireless section among all delays that occur during transmission will be described.

Figure 22:
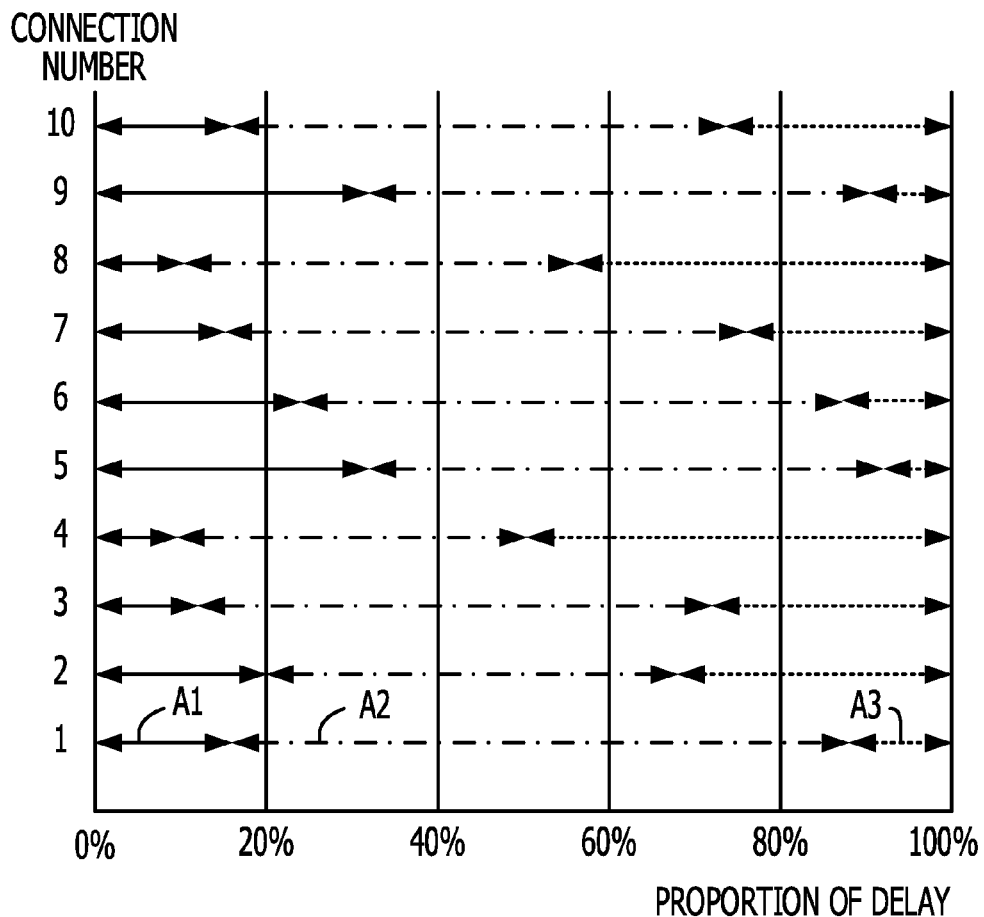
FIG. 22 illustrates the results of delay analysis according to the second embodiment.

FIG. 22 illustrates the results of delay analysis according to the second embodiment. The vertical axis represents connection number, and the horizontal axis represents the proportion of each cause of delay from the beginning to the end of a connection.

The delay indicated by the solid arrow A1 represents a delay that occurs in the wireless section. The delays indicated by the (broken) arrow A2 and the (dotted) arrow A3 represent delays other than the delay occurring in the wireless section (for example, a processing delay on the server 200 side or a processing delay on the wireless terminal 300 side).

As illustrated in FIG. 22, a delay occurring in the wireless section exists in every connection. The technique according to the embodiments makes it possible to efficiently and appropriately determine whether or not the current delay is occurring in the wireless section. As a result, after the cause of delay is identified, it is possible to execute a control for resolving the cause of delay at an early stage.

As has been described above, according to the network monitoring device 100, packet capture is facilitated by placing each monitoring device not in the wireless section but in the wired section. Placing each network monitoring device not near the wireless terminal but in the core network enables concentration of network monitoring devices, which makes it possible to reduce the number of network monitoring devices. In this way, the wireless section in which a delay is occurring may be efficiently identified.

The information processing according to the first and second embodiments may be implemented by execution of a program by a processor such as a CPU included in a computer. The program may be recorded on a computer-readable recording medium (for example, the recording medium 13).

To circulate a program, for example, a portable recording medium in which the program is recorded is provided. Alternatively, a program may be recorded in a storage device of another computer in advance, and the program may be distributed via a network. For example, the computer stores a program recorded on a portable recording medium or a program received from another computer, into a storage device. Then, the computer reads the program from the storage device and executes the program. The computer may directly execute a program read from a portable recording medium. The computer may directly execute a program received from another computer via a network.

At least part of the processing functions mentioned above may be implemented by an electronic circuit such as a digital signal processor (DSP), an application specific integrated circuit (ASIC), or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network analysis method performed by a computer, the network analysis method comprising:
   receiving packets from a wired network;
   extracting, from the packets, a plurality of continuous packets transmitted by a communication device, and a plurality of acknowledgement packets transmitted by a wireless communication device in response to the plurality of continuous packets;
   identifying selected acknowledgment packets from among the plurality of acknowledgement packets, based on a time interval of the plurality of continuous packets and a reception interval of the plurality of acknowledgment packets; and
   determining whether a delay is due to the wireless communication between the wireless communication device and an access point, based on the time interval of the plurality of continuous packets, and a time interval of the plurality of acknowledgment packets,
   wherein the identifying of the selected acknowledgment packets includes:
      determining a pair of the plurality of acknowledgment packets for which a difference between a time interval of a plurality of corresponding continuous packets and a time interval of the acknowledgement packets is greater than or equal to a threshold, and
      excluding a pair of acknowledgement packets for which the difference is less than the threshold from being subject to analysis for the determining.

2. The network analysis method according to claim 1, wherein the identifying of the selected acknowledgement packets includes measuring a communication condition of the continuous packets transmitted by the wireless communication device, and determining, as the threshold, an upper limit of a time interval at which no delay is determined as occurring.

3. The network analysis method according to claim 1, wherein the determining of whether a delay is occurring includes extracting a pair of retransmitted acknowledgment packets from the plurality of acknowledgement packets, and determining whether a delay is occurring in the wireless communication based on a periodicity of a time interval of the acknowledgment packets included in the pair.

4. The network analysis method according to claim 3, wherein
the determining indicates a delay is occurring in the wireless communication when a reception timing of the acknowledgement packets coincides with one of a period characteristic of a communication standard used in a wireless section, and a period within a predetermined precision.

5. An information processing device, comprising:
a memory; and
a processor coupled to the memory and configured to:
receive packets from a wired network,
extract, from the received packets, a plurality of continuous packets transmitted by a communication device, and a plurality of acknowledgement packets transmitted by a wireless communication device in response to the plurality of continuous packets,
identify selected acknowledgment packets of the plurality of acknowledgement packets, based on a time interval of the plurality of continuous packets, and a reception interval of the plurality of acknowledgment packets,
determine whether a delay is due to the wireless communication between the wireless communication device and an access point, based on the time interval of the plurality of continuous packets, and the time interval of the selected acknowledgment packets,
wherein the processor is configured to:
determine a pair of the plurality of acknowledgment packets for which a difference between a time interval of a plurality of corresponding continuous packets and a time interval of the acknowledgement packets is greater than or equal to a threshold, and
exclude a pair of acknowledgement packets for which the difference is less than the threshold from being subject to analysis for the determining.

6. The information processing device according to claim 5, wherein the information processing device is placed in a wired section within the wired network.

7. The information processing device according to claim 5, wherein the processor is configured to:
measure a communication condition of the continuous packets transmitted by the wireless communication device, and
determine, as the threshold, an upper limit of a time interval at which no delay is determined as occurring.

8. The information processing device according to claim 5, wherein the processor is configured to:
extract a pair of retransmitted acknowledgment packets from the plurality of acknowledgement packets, and
determine whether the delay is occurring in the wireless communication based on a periodicity of a time interval of the acknowledgment packets included in the pair.

9. The information processing device according to claim 8, wherein the processor is configured to determine whether the delay is occurring in the wireless communication when a reception timing of the acknowledgement packets coincides with one of a period characteristic of a communication standard used in a wireless section, and a period within a predetermined precision.

10. The information processing device according to claim 5, wherein the access point is communicatively coupled with the wired network and the wireless network.

11. The information processing device according to claim 5, wherein the wireless communication is analyzed by monitoring the wired network.

12. A non-transitory computer-readable recording medium storing a program causing a computer to execute a process, the process comprising:
receiving packets from a wired network;
extracting, from the received packets, a plurality of continuous packets transmitted by a communication device, and a plurality of acknowledgement packets transmitted by a wireless communication device in response to the plurality of continuous packets;
identifying a selected acknowledgment packets of the plurality of acknowledgement packets, based on a time interval of the plurality of continuous packets, and a reception interval of the plurality of acknowledgment packets; and
determining whether a delay is due to the wireless communication between the wireless communication device and an access point, based on the time interval of the plurality of continuous packets, and a time interval of the selected acknowledgment packets;
wherein the identifying of the selected acknowledgment packets includes:
determining a pair of the plurality of acknowledgment packets for which a difference between a time interval of a plurality of corresponding continuous packets and a time interval of the acknowledgement packets is greater than or equal to a threshold, and
excluding a pair of acknowledgement packets for which the difference is less than the threshold from being subject to analysis for the determining.

13. The network analysis method according to claim 1, wherein the access point is communicatively coupled with the wired network and the wireless network.

14. The network analysis method according to claim 1, wherein the wireless communication is analyzed by monitoring the wired network.

15. The recording medium according to claim 12, wherein the identifying of the selected acknowledgement packets includes measuring a communication condition of the continuous packets transmitted by the wireless communication device, and determining, as the threshold, an upper limit of a time interval at which no delay is determined as occurring.

16. The recording medium according to claim 12, wherein the determining of whether a delay is occurring includes extracting a pair of retransmitted acknowledgment packets from the plurality of acknowledgement packets, and determining whether a delay is occurring in the wireless communication based on a periodicity of a time interval of the acknowledgment packets included in the pair.

17. The recording medium according to claim 16, wherein the determining indicates a delay is occurring in the wireless communication when a reception timing of the acknowledgement packets coincides with one of a period characteristic of a communication standard used in a wireless section, and a period within a predetermined precision.

18. The network analysis method according to claim 12, wherein the access point is communicatively coupled with the wired network and the wireless network.

19. The network analysis method according to claim 12, wherein the wireless communication is analyzed by monitoring the wired network.

* * * * *